(12) United States Patent
Shirokawa et al.

(10) Patent No.: US 11,143,904 B2
(45) Date of Patent: Oct. 12, 2021

(54) DISPLAY DEVICE

(71) Applicant: Tianma Japan, Ltd., Kanagawa (JP)

(72) Inventors: Masanori Shirokawa, Kanagawa (JP); Ken Sumiyoshi, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 377 days.

(21) Appl. No.: 16/136,527

(22) Filed: Sep. 20, 2018

(65) Prior Publication Data

US 2019/0086722 A1 Mar. 21, 2019

(30) Foreign Application Priority Data

Sep. 20, 2017 (JP) .............................. JP2017-179720

(51) Int. Cl.
*G02F 1/1335* (2006.01)
*G02B 27/09* (2006.01)
(Continued)

(52) U.S. Cl.
CPC ... *G02F 1/133526* (2013.01); *G02B 27/0961* (2013.01); *G02F 1/13* (2013.01);
(Continued)

(58) Field of Classification Search
CPC ... G02F 1/13; G02F 1/29; G02F 1/163; G02B 27/01; G02B 27/0101; G02B 27/0149;
(Continued)

(56) References Cited

U.S. PATENT DOCUMENTS 5,737,012 A * 4/1998 Tabata ............... G02B 27/017
348/53
2003/0231293 A1* 12/2003 Blum ............... G02F 1/133371
356/5.01
(Continued)

FOREIGN PATENT DOCUMENTS

CN 104614861 A 5/2015
CN 105629469 A 6/2016
(Continued)

OTHER PUBLICATIONS

Notification of the First Office Action issued in Chinese Patent Application No. 201811038158.2 dated Apr. 25, 2021 with English translation provided.
(Continued)

*Primary Examiner* — Travis S Fissel
(74) *Attorney, Agent, or Firm* — Nixon & Vanderhye

(57) ABSTRACT

A display device includes: a display module including elemental pixel groups, each of the elemental pixel groups being configured to display an elemental image for displaying a reproduced image; an elemental lens array including elemental lenses, the elemental lenses being provided in front of the elemental pixel groups in one-to-one correspondence; a diopter adjustment element array including diopter adjustment elements, the diopter adjustment elements being provided in front of the plurality of elemental lenses in one-to-one correspondence; and a controller. The controller is configured to: control a part of the diopter adjustment elements in accordance with visual acuity of one eye of a user; and control the other part of the diopter adjustment elements in accordance with visual acuity of the other eye of the user.

12 Claims, 19 Drawing Sheets

(51) Int. Cl.
*G06F 3/01* (2006.01)
*G02F 1/13* (2006.01)
*G02F 1/29* (2006.01)
*G06F 1/16* (2006.01)

(52) U.S. Cl.
CPC ............... *G02F 1/29* (2013.01); *G06F 1/163* (2013.01); *G06F 3/011* (2013.01); *G06F 3/013* (2013.01); *G02F 1/294* (2021.01)

(58) Field of Classification Search
CPC .............. G02B 27/017; G02B 27/0172; G02B 27/0176; G02B 27/0179; G02B 27/0961
USPC ................ 351/159.03; 359/13, 14, 629–633, 359/462–477; 345/7–9; 348/115, 42, 348/51–60; 349/11
See application file for complete search history.

(56) References Cited

U.S. PATENT DOCUMENTS

| | | | |
|---|---|---|---|
| 2007/0097277 A1 | 5/2007 | Hong et al. | |
| 2013/0215504 A1* | 8/2013 | Kim | H04N 13/332 359/464 |
| 2013/0258461 A1* | 10/2013 | Sato | G02B 27/0172 359/464 |
| 2013/0265623 A1 | 10/2013 | Sugiyama et al. | |
| 2015/0189266 A1* | 7/2015 | Zhou | H04N 13/25 348/54 |
| 2016/0018645 A1* | 1/2016 | Haddick | G06T 19/20 345/8 |
| 2018/0203324 A1* | 7/2018 | Li | G02F 1/29 |

FOREIGN PATENT DOCUMENTS

| | | |
|---|---|---|
| JP | H07-318850 A | 12/1995 |
| JP | H08-076051 A | 3/1996 |
| JP | H08-166556 A | 6/1996 |
| JP | 2006-272005 A | 10/2006 |
| JP | 2012-018245 A | 1/2012 |
| JP | 2013-205749 A | 10/2013 |
| JP | 2013-235256 A | 11/2013 |
| JP | 2014-038302 A | 2/2014 |
| WO | 2006/001158 A1 | 1/2006 |

OTHER PUBLICATIONS

Office Action issued in Japanese Patent Application No. 2017-179720 dated Jul. 27, 2021.

\* cited by examiner

DISPLAY DEVICE

CROSS-REFERENCE TO RELATED APPLICATIONS

This Non-provisional application claims priority under 35 U.S.C. § 119(a) on Patent Application No. 2017-179720 filed in Japan on Sep. 20, 2017, the entire content of which is hereby incorporated by reference.

BACKGROUND

This disclosure relates to a display device.

People who use vision corrective tools such as spectacles or contact lenses are increasing with prevalence of computers and mobile terminals that operate with display devices and increase in aging population. In general, a human has different visual acuity in the right and left eyes; the vision corrective tools correct the optical path to the eyes appropriately for each eye having different visual acuity.

For example, JP 2014-038302 A discloses universal varifocal spectacles for users having different visual acuity or a user having different visual acuity in the right and left eyes to individually and clearly see objects at different distances with simple operation.

SUMMARY

An aspect of the disclosure is a display device comprising: a display module including a plurality of elemental pixel groups, each of the plurality of elemental pixel groups being configured to display an elemental image for displaying a reproduced image; an elemental lens array including a plurality of elemental lenses, the plurality of elemental lenses being provided in front of the plurality of elemental pixel groups in one-to-one correspondence; a diopter adjustment element array including a plurality of diopter adjustment elements, the plurality of diopter adjustment elements being provided in front of the plurality of elemental lenses in one-to-one correspondence; and a controller, wherein the controller is configured to: control a part of the plurality of diopter adjustment elements in accordance with visual acuity of one eye of a user; and control the other part of the plurality of diopter adjustment elements in accordance with visual acuity of the other eye of the user.

It is to be understood that both the foregoing general description and the following detailed description are exemplary and explanatory and are not restrictive of this disclosure.

EMBODIMENTS

Figure 1A:
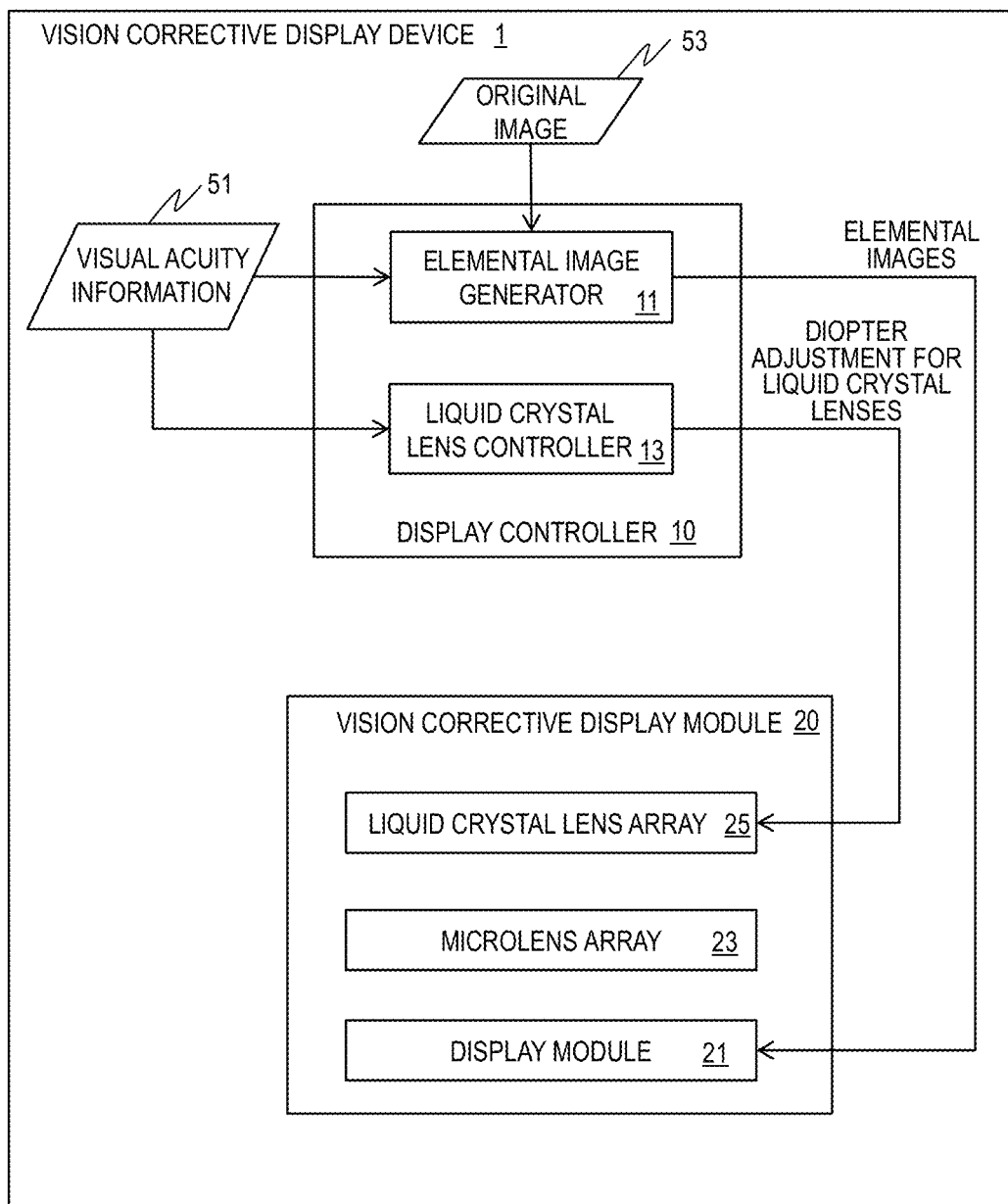
FIG. 1A schematically illustrates an example of a logical configuration of a vision corrective display device in this disclosure.

Hereinafter, embodiments of this invention will be described with reference to the accompanying drawings. It should be noted that the embodiments are merely examples to implement this invention and are not to limit the technical scope of this invention.

The vision corrective display device disclosed herein utilizes integral imaging based on the principle of integral photography. The integral imaging is a technique that displays a stereoimage (reproduced image). The integral imaging provides light from a plurality of elemental images through microlenses (elemental lenses) associated therewith in one-to-one correspondence to form a reproduced image at a specific position.

The rays of light transmitted through the plurality of microlenses are rays of light that reproduce the rays of light from an object actually existing at the position of the reproduced image. The user can see the reproduced image without special spectacles. The integral photography and the integral imaging are well-known technologies and therefore, detailed description is omitted herein.

The vision corrective display device in this disclosure includes a display module, a microlens array provided in front of the display module, and a liquid crystal lens array (diopter adjustment element array) provided in front of the microlens array. In front of each microlens, a liquid crystal lens (diopter adjustment element) associated therewith is provided. The microlens is an elemental lens; the liquid crystal lens is an example of a diopter adjustment element; and the liquid crystal lens array is an example of a diopter adjustment element array. The display module displays a plurality of elemental images based on the principle of integral photography.

The number of elemental images is equal to the number of microlenses. Each elemental image is associated with a different microlens; the rays of light from each elemental image pass through the associated microlens and enter the liquid crystal lens array. The liquid crystal lens is a varifocal lens or a diopter variable lens. A varifocal lens different from the liquid crystal lens may be employed.

The controller controls the elemental images and the liquid crystal lens array in accordance with the visual acuity of the user. The position of the reproduced image can be changed by changing the elemental images. The position of the reproduced image to be seen by the user is in front of or behind the vision corrective display device. For example, the vision corrective display device displays a reproduced image in front of the vision corrective display device for a myopic user and behind the vision corrective display device for a hyperopic user.

The controller controls the liquid crystal lenses for the right eye of the liquid crystal lens array and the liquid crystal lenses for the left eye of the liquid crystal lens array in accordance with the visual acuity of the right eye and the visual acuity of the left eye, respectively. Specifically, the controller adjusts the dioptric power of each liquid crystal lens in accordance with the visual acuity of the user's right eye or left eye. Such control of the elemental images and the liquid crystal lens array enables displaying images appropriately for users having various visual acuity levels.

Hereinafter, embodiments are specifically described with reference to the drawings. Elements common to the drawings are denoted by the same reference signs. For clarity of explanation, the sizes and the shapes of the elements may be exaggerated in the drawings.

Device Configuration

FIG. 1A schematically illustrates an example of a logical configuration of the vision corrective display device 1 in this disclosure. The vision corrective display device 1 includes a display controller 10 and a vision corrective display module 20. The display controller 10 includes an elemental image generator 11 and a liquid crystal lens controller 13. The vision corrective display module 20 includes a display module 21, a microlens array (elemental lens array) 23, and a liquid crystal lens array 25.

The display module 21 can be a liquid crystal display module or an organic light-emitting diode (OLED) display module. The display module 21 can be of any type of display module. The display module 21 includes a display panel including a plurality of pixels arrayed in a matrix, a driving circuit for driving the pixels of the display panel, and a control circuit for the driving circuit, for example.

The elemental image generator 11 generates a plurality of elemental images (data thereof) from an original image (data thereof) 53 based on visual acuity information 51 on the user. The elemental image generator 11 sends the generated elemental images to the display module 21. The display module 21 displays the plurality of generated elemental images on a single screen.

The liquid crystal lens controller 13 controls the liquid crystal lens array 25 based on the visual acuity information 51 on the user. Specifically, the liquid crystal lens controller 13 controls the dioptric powers (focal lengths) of the liquid crystal lenses of the liquid crystal lens array 25 in accordance with the visual acuity information 51 on the user. As will be described later, the liquid crystal lens controller 13 controls the dioptric power of one liquid crystal lens in accordance with the visual acuity of the user's right eye or left eye.

The liquid crystal lens controller 13 further controls the liquid crystal lens array 25 in accordance with user operation. The liquid crystal lens controller 13 adjusts the dioptric powers of the liquid crystal lenses for the right eye and the liquid crystal lenses for the left eye in response to the user input about the right eye and the left eye. As a result, an image more appropriate for the actual visual acuity of the user is displayed.

Figure 1B:
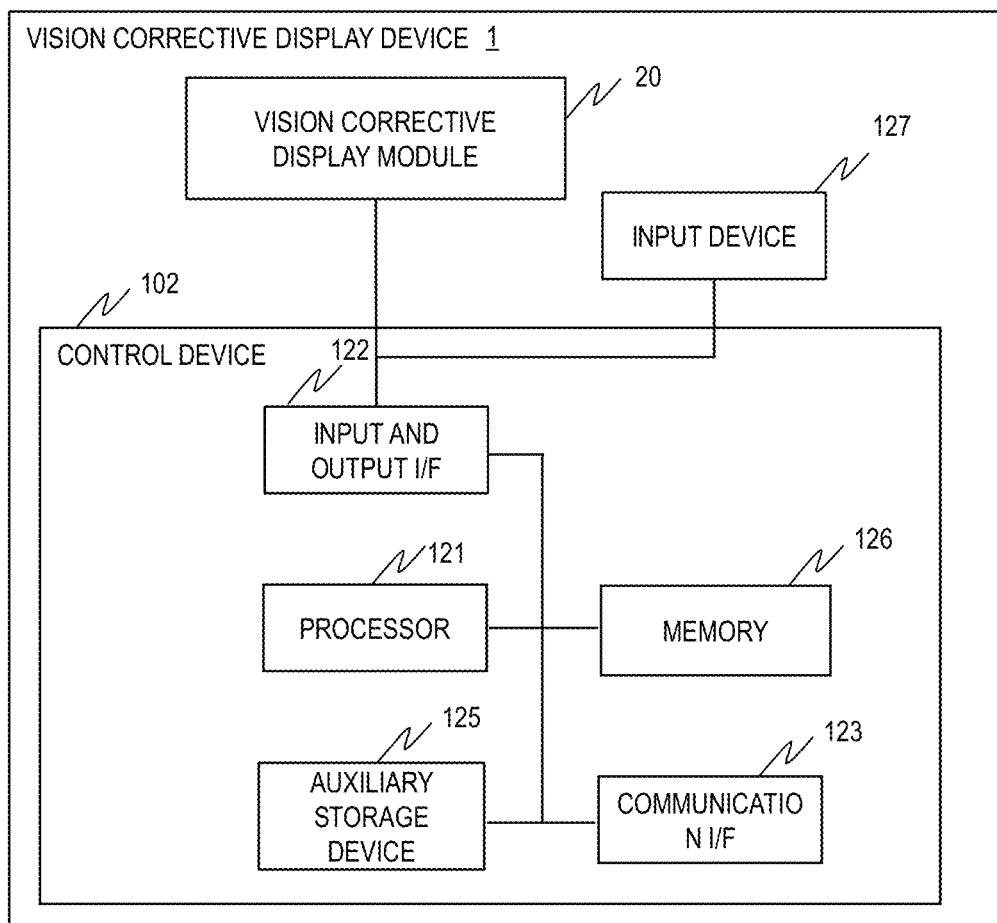
FIG. 1B schematically illustrates an example of a hardware configuration of the vision corrective display device.

FIG. 1B schematically illustrates an example of a hardware configuration of the vision corrective display device 1. The vision corrective display device 1 is incorporated in a mobile information terminal (including a mobile phone such as a smartphone).

The vision corrective display device 1 includes a control device 102 and an input device 127 in addition to the vision corrective display module 20. The control device 102 may have a computer configuration. Specifically, the control device 102 includes a processor 121, an input and output interface (input and output I/F) 122, a communication interface (communication I/F) 123, an auxiliary storage device 125, and a memory 126. These are connected through a bus.

The input and output interface 122 includes a plurality of ports and is connectable with a plurality of external devices. The input and output interface 122 converts the internal protocol to the external protocol, and vice versa. In FIG. 1B, the input and output interface 122 is connected with the vision corrective display module 20. The control signals for the display module 21 and the liquid crystal lens array 25 are sent from the input and output interface 122.

The input and output interface 122 is further connected with the input device 127. The input device 127 is a device to be operated by a user, such as a touch panel device (to be used with the display device) or an operation button. A signal from the input device 127 is received by the input and output interface 122.

The communication interface 123 is a network interface device for controlling communication with other devices in accordance with a predetermined protocol. The communication interface 123 may include an interface for connecting to an external memory.

The auxiliary storage device 125 is a non-volatile storage device such as a flash memory device and stores a program to be executed by the processor 121 and data to be used in executing the program. The auxiliary storage device 125 in this example stores an original image 53. The original image 53 is an image to be stereoscopically displayed by the vision corrective display module 20. The auxiliary storage device 125 can store a plurality of original images. Although the original image 53 is a still image, a motion picture can be produced with a plurality of original images.

In general, data stored in the auxiliary storage device 125 is loaded to the memory 126 to be used. The memory 126 can be a volatile memory and stores a program to be used by the processor 121 and data to be used in executing the program. Each of the auxiliary storage device 125, the memory 126, and the combination of these is a storage device.

The processor 121 executes a program stored in the memory 126. The processor 121 operates in accordance with a program to work as a function unit (means) to implement a predetermined function. For example, the processor 121 operates in accordance with an elemental image generation program to function as the elemental image generator 11 or operates in accordance with a liquid crystal lens control program to function as the liquid crystal lens controller 13.

Although the elemental image generator 11 and the liquid crystal lens controller 13 in this example are implemented by the processor 121, logical circuits having these functions may be mounted, in addition to the processor 121.

Figure 1C:
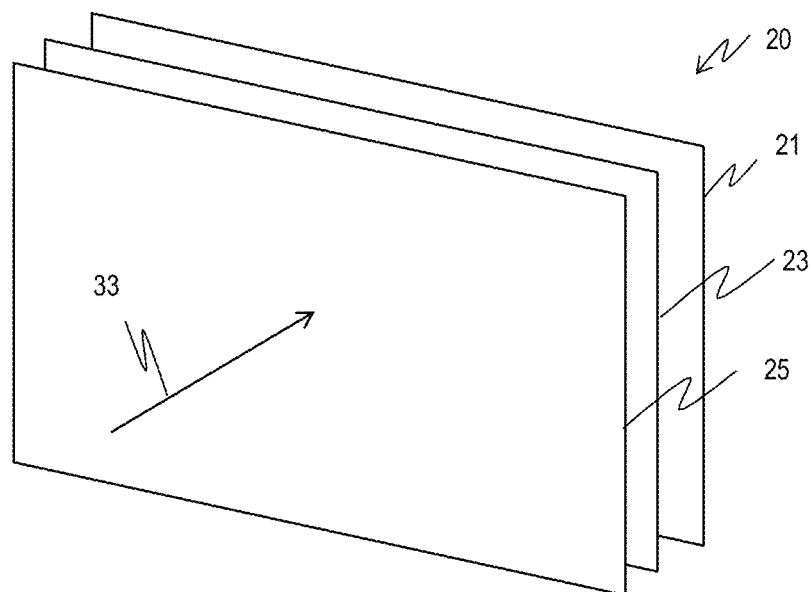
FIG. 1C schematically illustrates an example of a configuration of a vision corrective display module.

FIG. 1C schematically illustrates an example of a configuration of the vision corrective display module 20. The user sees the vision corrective display module 20 in the direction 33. In this disclosure, the user sees an image from the front of the vision corrective display module 20. In other words, the user side of the vision corrective display module 20 is the front side and the opposite side is the back side.

As illustrated in FIG. 1C, the microlens array 23 is provided in front of the display module 21 and the liquid crystal lens array 25 is provided in front of the microlens array 23. The display module 21 includes a plurality of pixels (a pixel array) disposed in a matrix.

The microlens array 23 includes a plurality of microlenses (elemental lenses) disposed in a matrix. The microlenses can be plano-convex lenses.

One microlens is opposed to a plurality of pixels (an elemental pixel group) associated therewith. The elemental pixel group opposed to one microlens displays one elemental image. Light from the elemental pixel group opposed to one microlens enters the microlens.

One liquid crystal lens is provided in front of one microlens to be opposed to the microlens. The light that has passed through the microlens passes through the opposed liquid crystal lens and travels to an eye of the user. Each liquid crystal lens is variable in dioptric power to control the divergence degree of the light transmitted therethrough.

In this disclosure, the divergence degree means the extent of divergence of light. The divergence degree of parallel light is 0. When the divergence angle is larger, the divergence degree is larger. Convergent light has a negative divergence degree; when the convergence angle is larger, the absolute value of the divergence degree is larger. As understood from this description, the angles of both divergent light and convergent light are represented by divergence degree in this disclosure. The divergence degree can be controlled by diverging or converging parallel light.

Myopia Correction with Liquid Crystal Lenses

Figure 2A:
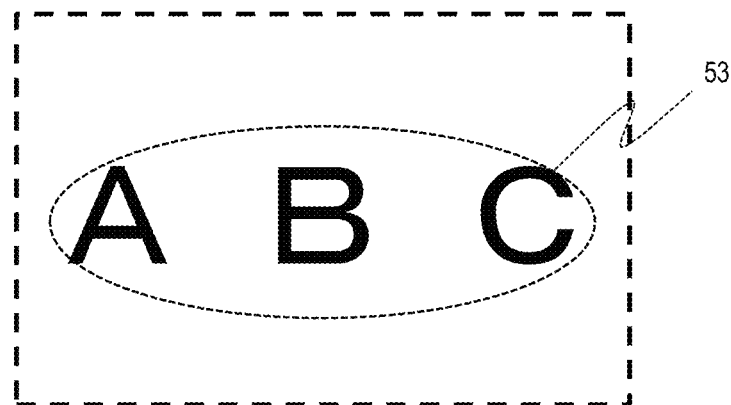
FIG. 2A provides an example of an original image.

Hereinafter, vision correction with liquid crystal lenses is described. First, myopia correction with liquid crystal lenses is described. In the case where the user is myopic, the vision corrective display device 1 displays an image to be seen at a position in front of the vision corrective display module 20. FIG. 2A provides an example of an original image 53. The original image 53 shows alphabets "ABC". The rectangular frame of a dashed line surrounding the original image 53 corresponds to the periphery of the display region of an elemental pixel group. In this example, the reproduced image to be displayed is a stereographic image having a depth of 0, or a planar image. The original image 53 may include information for displaying a stereoscopic image having a depth to be seen.

Figure 2B:
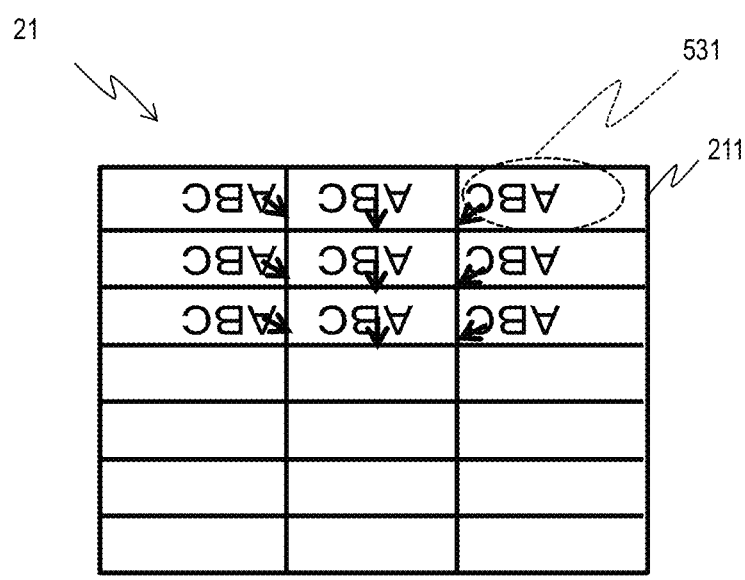
FIG. 2B provides elemental images for forming an image to be seen by the user in front of the vision corrective display module or between the vision corrective display module and the user.

FIG. 2B provides elemental images 531 for forming an image to be seen by the user in front of the vision corrective display module 20 or between the vision corrective display module 20 and the user. Each elemental pixel group 211 displays one elemental image 531. Each elemental pixel group 211 displays an elemental image 531 appropriate for the user to see a reproduced image of the original image 53 at a specific position.

Each elemental image 531 has an orientation such that the original image 53 is rotated by 180 degrees in the plane. The position of the elemental image 531 displayed by the elemental pixel group 211 is shifted toward the center of the display region of the display module 21. The position of the reproduced image is changed, for example to be closer to the user or to be farther from the user, by changing the position and the shape of the elemental image 531 in the elemental pixel group 211.

Figure 3A:
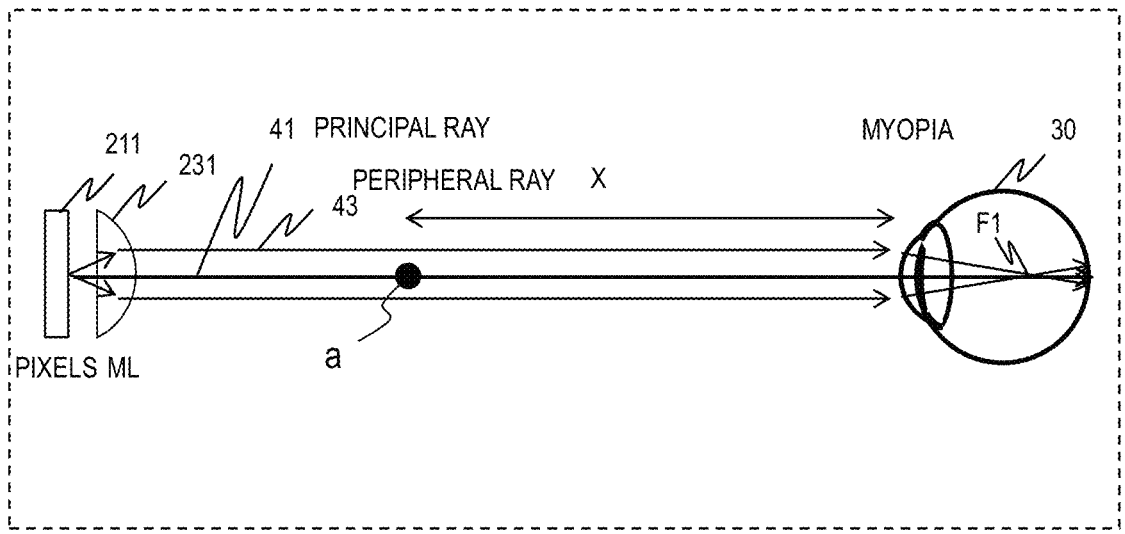
FIG. 3A schematically illustrates rays of light from a point in an elemental pixel group when no liquid crystal lens is provided.

FIG. 3A schematically illustrates rays of light from a point in an elemental pixel group 211 when no liquid crystal lens is provided. In the example of FIG. 3A, one elemental pixel group 211 is opposed to only one microlens 231. Divergent light from a point of the elemental pixel group 211 enters the microlens 231 opposed to the elemental pixel group 211. The divergent light turns into parallel light because of refraction by the microlens 231.

The light from a point of the elemental pixel group 211 travels in parallel to the line starting from the point and passing through the center of the microlens 231. This line corresponds to the principal ray 41. In parallel light, the peripheral rays 43 are parallel to the principal ray 41. The parallel light from the microlens 231 enters an eye 30 of the user.

The principal rays 41 from the corresponding points of different elemental images 531 intersect at a point a of the reproduced image. The user recognizes the light in the viewing direction that passes through the point a as light from the point a of the reproduced image. In the example of FIG. 3A, the distance X is the distance between the point a and the eye 30 in the direction of the normal to the display module 21, or the distance between the reproduced image and the eye 30. As understood from this description, the integral imaging reproduces light reflected off an object to make the user recognize the reproduced image.

In the state illustrated in FIG. 3A, the eye 30 is myopic; the focal point F1 of the light from the reproduced image is in front of the retina. In this condition, the reproduced image seen by the user with the eye 30 is blurry and the user cannot see it clearly.

Figure 3B:
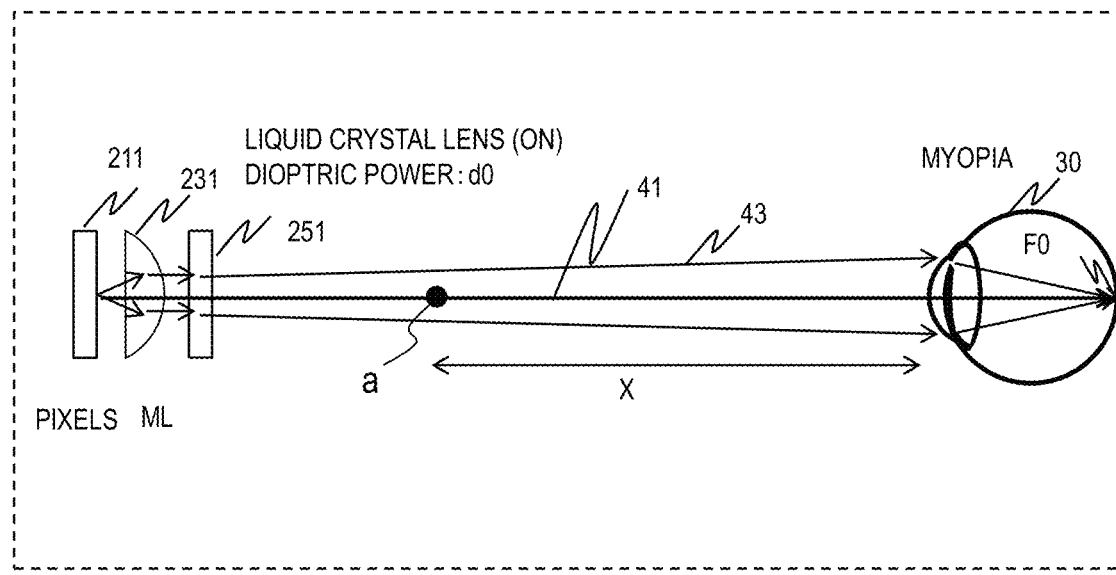
FIG. 3B schematically illustrates correction of a reproduced image with a liquid crystal lens.

FIG. 3B schematically illustrates correction of the reproduced image with a liquid crystal lens 251. FIG. 3B illustrates correction for a user who cannot clearly see the reproduced image at the distance X because of myopia. The liquid crystal lens 251 has a dioptric power d0. The value of d0 in diopter is a negative value and the liquid crystal lens 251 functions as a concave lens.

In this example, the liquid crystal lens 251 increases the divergence degree of the parallel light from the microlens 231 to convert the incident parallel light to divergent light. The liquid crystal lens 251 increases the extent of divergence of the peripheral rays 43 while maintaining the traveling direction of the principal ray 41. The principal ray 41 passes through the point a in the same manner as when the liquid crystal lens 251 is not provided (the power of the liquid crystal lens is 0 diopters).

The divergent light from the liquid crystal lens 251 enters the user's eye 30. Because of the change in incident angle onto the eye 30, the focal point of the incident light on the eye 30 moves from the point F1 in front of the retina to the point F0 on the retina. In this way, the liquid crystal lens 251 changes the extent of divergence of the peripheral rays to correct the reproduced image at the distance X, so that the reproduced image is clearly seen with the eye 30. The correction with the liquid crystal lens 251 corresponds to moving the reproduced image closer to the user's eye 30. Moving the reproduced image closer to the eye 30 enables the myopic eye 30 to focus the light of the reproduced image on the retina.

Figure 4A:
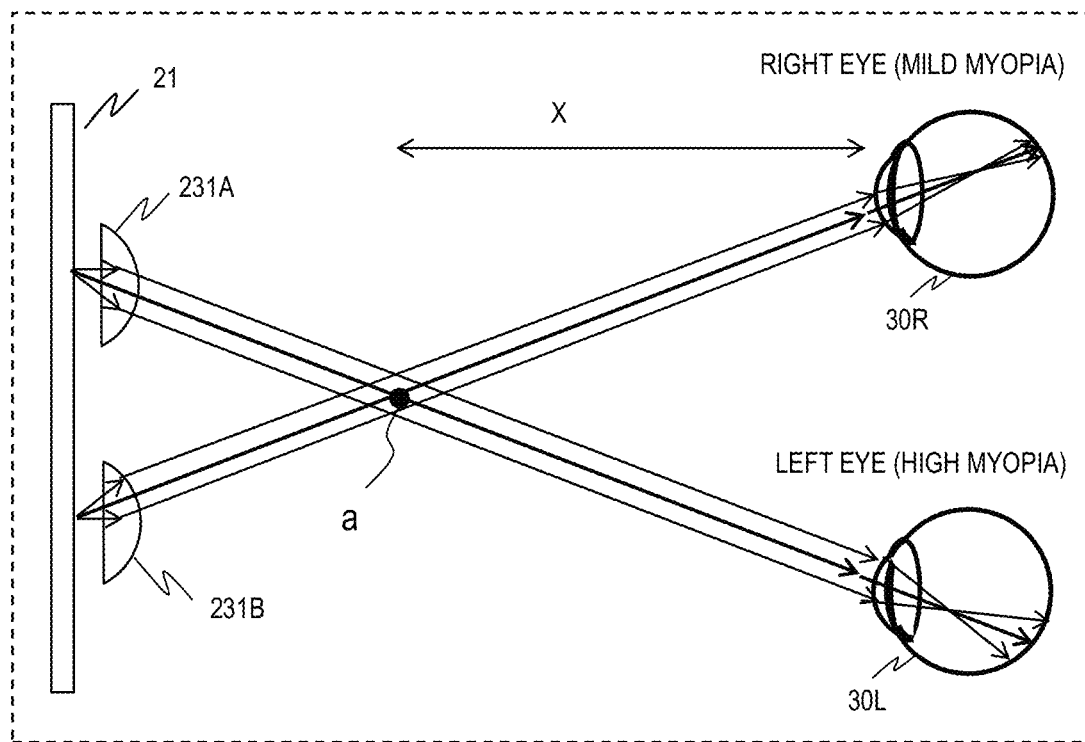
FIG. 4A illustrates an example where the description provided with reference to FIG. 3A is applied to both the right and left eyes.
Figure 4B:
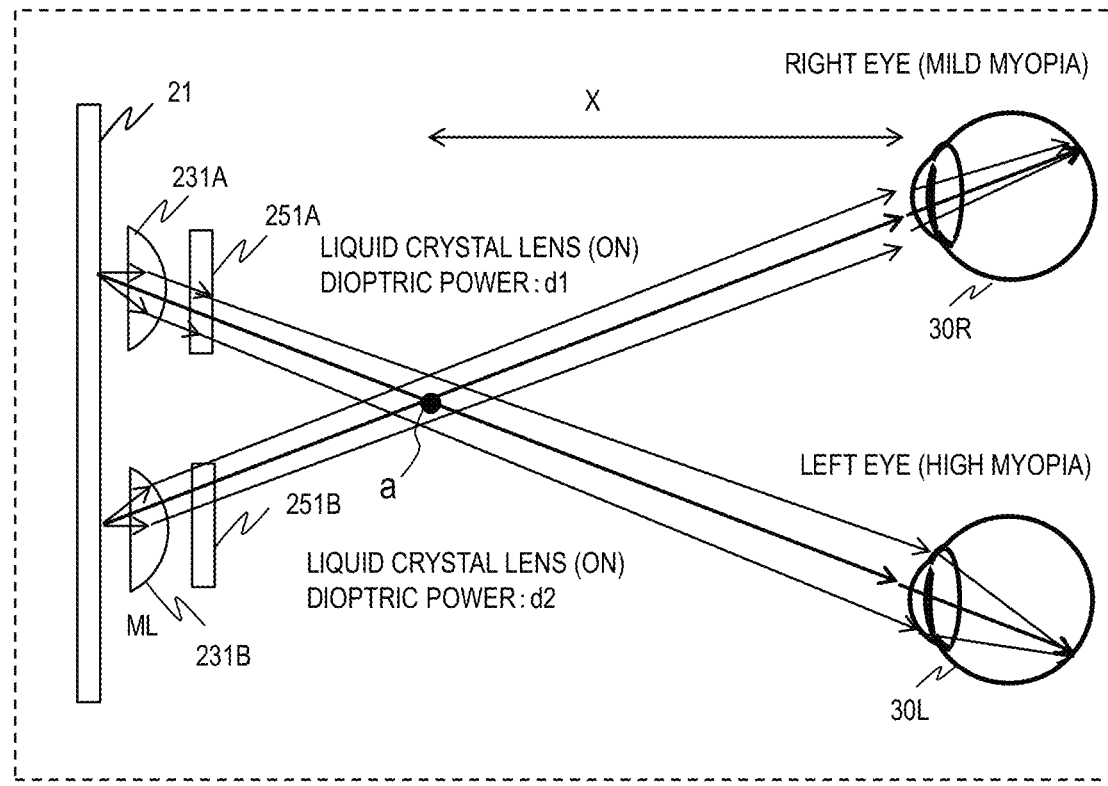
FIG. 4B illustrates an example where the description provided with reference to FIG. 3B is applied to both the right and left eyes.

FIGS. 4A and 4B illustrate an example where the description provided with reference to FIGS. 3A and 3B is applied to both the right and left eyes. FIG. 4A illustrates the configuration in which the liquid crystal lens array 25 is omitted or the powers of the liquid crystal lenses therein are 0 diopters. The light from the point of one elemental image corresponding to a point of the reproduced image passes through a microlens 231A and enters the left eye 30L. The light from the point of another elemental image corresponding to the same point of the reproduced image passes through a microlens 231B and enters the right eye 30R.

As described above, the divergent light from a point of an elemental image is converted by a microlens into parallel light. The principal rays from the microlenses 231A and 231B both pass through the point a. The point a is a position of the corresponding point of the reproduced image.

In the example of FIG. 4A, the right eye 30R is mildly myopic and the left eye 30L is highly myopic. The focal points of the right eye 30R and the left eye 30L are both in front of the retina; the user cannot clearly see the reproduced image with either the right eye 30R or the left eye 30L.

As illustrated in FIG. 4B, a liquid crystal lens 251A is provided in front of the microlens 231A and a liquid crystal lens 251B is provided in front of the microlens 231B. The liquid crystal lenses 251A and 251B correct the travel of the light from the microlenses 231A and 231B, respectively.

The liquid crystal lens controller 13 of the display controller 10 independently controls the dioptric powers of the liquid crystal lenses 251A and 251B. The liquid crystal lens controller 13 controls the dioptric powers of the liquid crystal lenses 251A and 251B to take negative values. The liquid crystal lens controller 13 further adjusts the liquid crystal lenses 251A and 251B so that the dioptric value d1 of the liquid crystal lens 251A is smaller (the absolute value is greater) than the dioptric value d2 of the liquid crystal lens 251B.

Both the principal rays from the liquid crystal lenses 251A and 251B pass through the point a. The divergent light from the liquid crystal lens 251A enters the high myopic left eye 30L and the divergent light from the liquid crystal lens 251B enters the mild myopic right eye 30R. The divergence degree of the light from the liquid crystal lens 251A is larger than the divergence degree of the light from the liquid crystal lens 251B. Accordingly, both the high myopic left eye 30L and the mild myopic right eye 30R can naturally focus the light on the retina.

As described above, in the case where the right eye and the left eye have different visual acuity, appropriate visual correction is achieved by independently controlling the liquid crystal lenses for the right eye and the liquid crystal lenses for the left eye.

Next, another way to correct the reproduced image with liquid crystal lenses is described. The way described with reference to FIG. 3A to FIG. 4B corrects light for myopia by increasing the divergence degree of the light from a microlens with a liquid crystal lens to make the divergent light from the liquid crystal lens enter the eye. The way described in the following focuses the liquid crystal lens the light from the microlens in front of the eye to make the divergent light from the focal point enter the eye. In the configuration described in the following, one elemental pixel group is opposed to only one microlens.

Figure 5A:
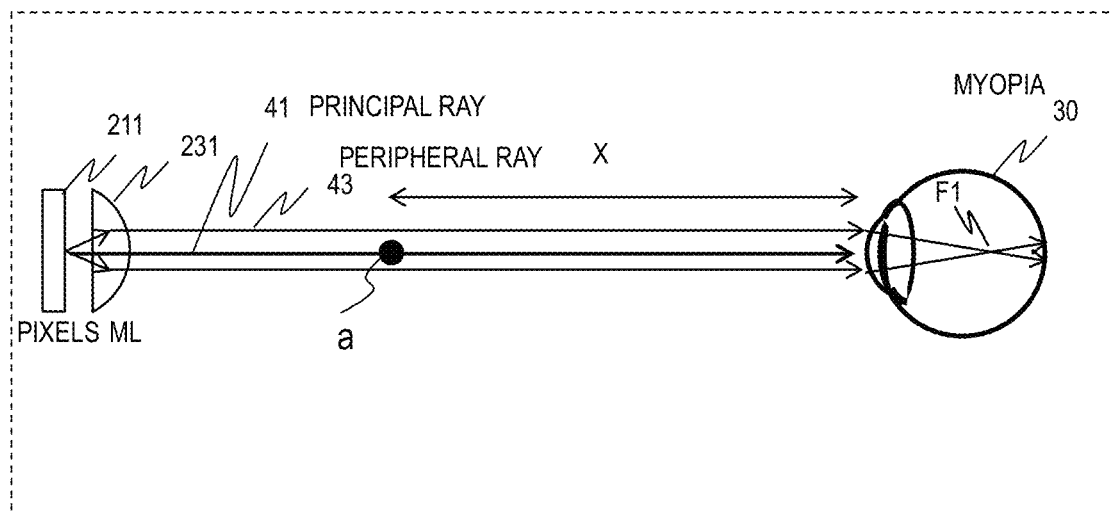
FIG. 5A schematically illustrates rays of light from a point in an elemental pixel group when no liquid crystal lens is provided.
Figure 5B:
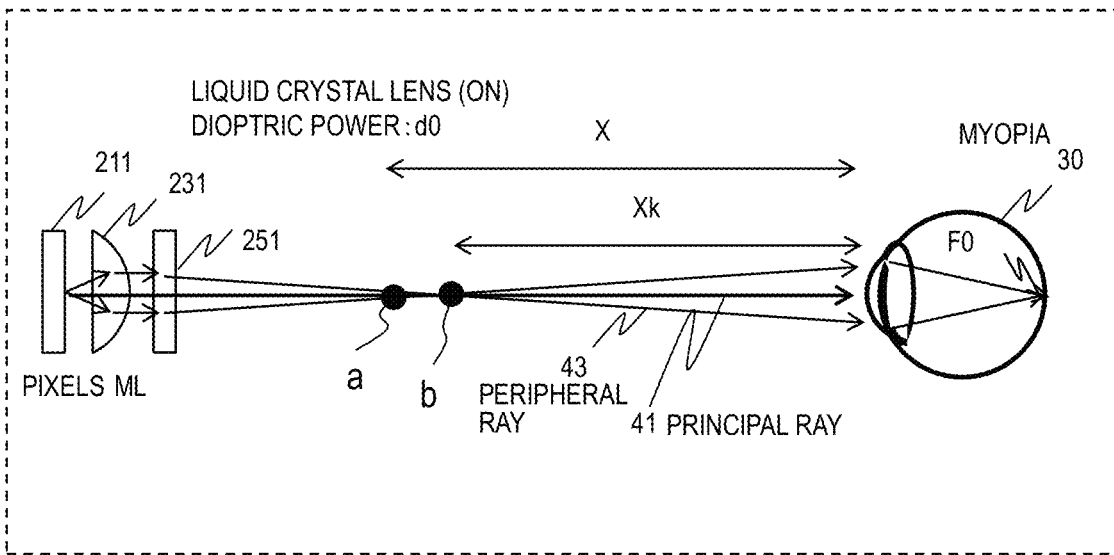
FIG. 5B schematically illustrates correction of a reproduced image with a liquid crystal lens.

FIGS. 5A and 5B are diagrams for illustrating this way to correct the reproduced image. FIG. 5A schematically illustrates rays of light from a point in an elemental pixel group 211 when no liquid crystal lens is provided. Divergent light from a point of the elemental pixel group 211 enters the microlens 231 opposed to the elemental pixel group 211. The divergent light turns into parallel light because of refraction by the microlens 231.

The light from a point of the elemental pixel group 211 travels in parallel to the line starting from the point and passing through the center of the microlens 231. The parallel light from the microlens 231 enters an eye 30 of the user. The user recognizes the light in the viewing direction that passes through the point a as light from the point a of the reproduced image. The distance between the point a and the eye 30 in the direction of the normal to the display module 21 is X.

In the state illustrated in FIG. 5A, the eye 30 is myopic; the focal point F1 of the light from the reproduced image is in front of the retina. In this condition, the reproduced image seen by the user with the eye 30 is blurry and the user cannot see it clearly.

FIG. 5B schematically illustrates correction of the reproduced image with a liquid crystal lens 251. FIG. 5B illustrates correction for the user who cannot clearly see the reproduced image at the distance X because of myopia. The liquid crystal lens 251 has a dioptric power d0. The value of d0 in diopter is a positive value and the liquid crystal lens 251 functions as a convex lens.

In this example, the liquid crystal lens 251 decreases the divergence degree of the parallel light from the microlens 231 to convert the incident parallel light to convergent light. The liquid crystal lens 251 decreases the extent of divergence of the peripheral rays 43 while maintaining the traveling direction of the principal ray 41. Accordingly, the principal ray 41 passes through the point a in the same manner as when the liquid crystal lens 251 is not provided (the power of the liquid crystal lens is 0 diopters).

The convergent light from the liquid crystal lens 251 is focused on the point b in front of the user's eye 30. Thereafter, divergent light from the point b enters the eye 30. Because of the change in incident angle onto the eye 30, the focal point of the incident light on the eye 30 moves from the point F1 in front of the retina to the point F0 on the retina. In this way, the liquid crystal lens 251 changes the extent of divergence of the peripheral rays to correct the reproduced image at the distance X, so that the reproduced image is clearly seen with the eye 30.

The correction with the liquid crystal lens 251 corresponds to moving the reproduced image closer to the user's eye 30. Moving the reproduced image closer to the eye 30 enables the myopic eye 30 to focus the light of the reproduced image on the retina.

Figure 6:
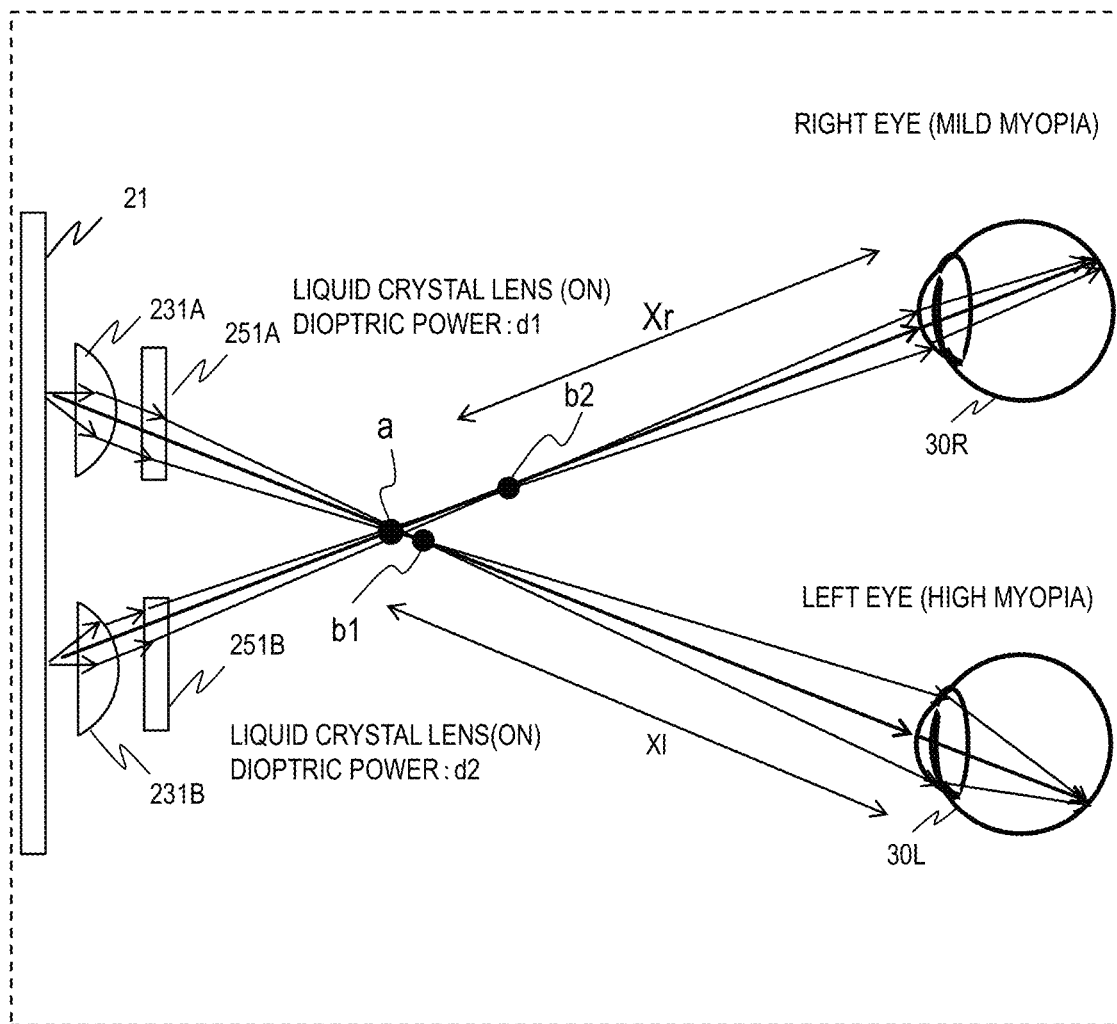
FIG. 6 illustrates an example where the description provided with reference to FIG. 5B is applied to both the right and left eyes.

FIG. 6 illustrates an example where the description provided with reference to FIG. 5B is applied to both the right and left eyes. The description provided with reference to FIG. 4A applies to the configuration in which the liquid crystal lens array 25 is omitted or the powers of the liquid crystal lenses therein are 0 diopters.

As illustrated in FIG. 6, a liquid crystal lens 251A is provided in front of a microlens 231A and a liquid crystal lens 251B is provided in front of a microlens 231B. The liquid crystal lenses 251A and 251B correct the travel of the light from the microlenses 231A and 231B, respectively.

The liquid crystal lens controller 13 of the display controller 10 independently controls the dioptric powers of the liquid crystal lenses 251A and 251B. The liquid crystal lens controller 13 controls the dioptric powers of the liquid crystal lenses 251A and 251B to take positive values. The liquid crystal lens controller 13 further adjusts the liquid crystal lenses 251A and 251B so that the dioptric value d1 of the liquid crystal lens 251A is greater than the dioptric value d2 of the liquid crystal lens 251B.

Both the principal rays from the liquid crystal lenses 251A and 251B pass through the point a. The convergent light from the liquid crystal lens 251A is focused at the point b1. The divergent light from the point b1 enters the high myopic left eye 30L. The convergent light from the liquid crystal lens 251B is focused at the point b2. The divergent light from the point b2 enters the mild myopic right eye 30R.

The distance Xl between the point b1 and the left eye 30L is longer than the distance Xr between the point b2 and the right eye 30R. That is to say, the distance between the liquid crystal lens 251A and the point b1 is shorter than the distance between the liquid crystal lens 251B and the point b2. Accordingly, the convergence degree of the convergent light from the liquid crystal lens 251A is larger than the convergence degree of the convergent light from the liquid crystal lens 251B. In other words, the divergence degree of the convergent light from the liquid crystal lens 251A is smaller than the divergence degree of the convergent light from the liquid crystal lens 251B.

As a result, the divergence degree of the divergent light from the point b1 is larger than the divergence degree of the divergent light from the point b2. Accordingly, both the high myopic left eye 30L and the mild myopic right eye 30R can naturally focus the light on the retina. As described above, in the case where the right eye and the left eye have different visual acuity, appropriate visual correction is achieved by independently controlling the liquid crystal lenses for the right eye and the liquid crystal lenses for the left eye.

Hyperopia Correction with Liquid Crystal Lens

Figure 7A:
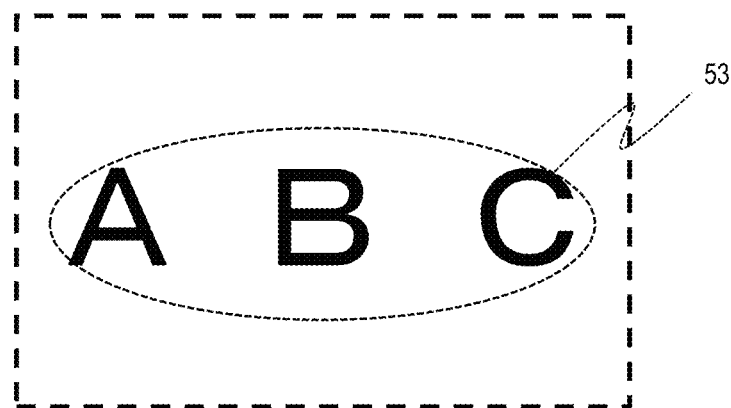
FIG. 7A provides an example of an original image.

Hereinafter, hyperopia correction with liquid crystal lenses is described. In the case where the user is hyperopic, the vision corrective display device 1 displays an image to be seen at a position behind the vision corrective display module 20. FIG. 7A provides an example of an original image 53. The original image 53 shows alphabets "ABC". The rectangular frame of a dashed line surrounding the original image 53 corresponds to the periphery of the display region of an elemental pixel group. In this example, the reproduced image to be displayed is a stereographic image having a depth of 0, or a planar image. The original image 53 may include information for displaying a stereoscopic image having a depth to be seen.

Figure 7B:
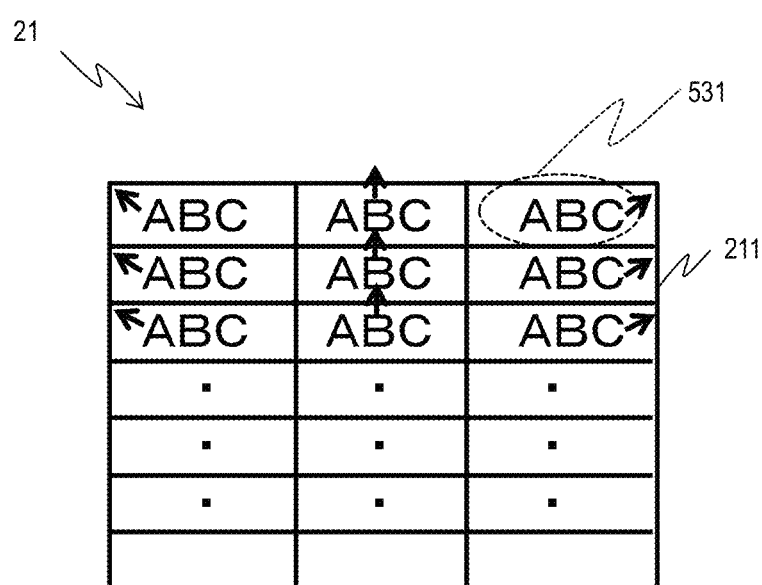
FIG. 7B provides elemental images for forming an image to be seen by the user behind the vision corrective display module.

FIG. 7B provides elemental images 531 for forming an image to be seen by the user behind the vision corrective display module 20. Each elemental pixel group 211 displays one elemental image 531. Each elemental pixel group 211 displays an elemental image 531 appropriate for the user to see a reproduced image of the original image 53 at a specific position.

Each elemental image 531 has the same orientation as the original image 53. The position of the elemental image 531 displayed by the elemental pixel group 211 is shifted away from the center of the display region of the display module 21. The position of the reproduced image is changed, for example to be closer to the user or to be farther from the user, by changing the position and the shape of the elemental image 531 in the elemental pixel group 211.

Figure 8A:
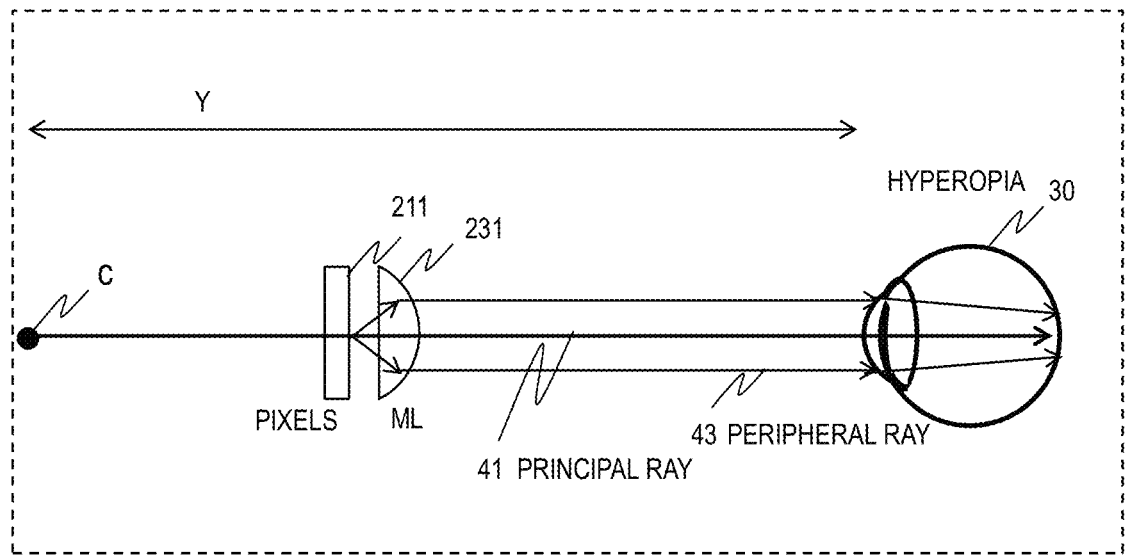
FIG. 8A schematically illustrates rays of light from a point in an elemental pixel group when no liquid crystal lens is provided.

FIG. 8A schematically illustrates rays of light from a point in an elemental pixel group 211 when no liquid crystal lens is provided. In the example of FIG. 8A, one elemental pixel group 211 is opposed to only one microlens 231. Divergent light from a point of the elemental pixel group 211 enters the microlens 231 opposed to the elemental pixel group 211. The divergent light turns into parallel light because of refraction by the microlens 231.

In the example of FIG. 8A, the distance Y is the distance between a point c in the reproduced image and the eye 30 in the direction of the normal to the display module 21, or the distance between the reproduced image and the eye 30. The reproduced image is located behind the display module 21. In other words, the display module 21 is located between the reproduced image and the eye 30.

The light from a point of the elemental pixel group 211 travels in parallel to the line starting from the point and passing through the center of the microlens 231. This line corresponds to the principal ray 41. The line of the principal ray 41 extended backward of the elemental pixel group 211 passes through the point c of the reproduced image.

The parallel light from the microlens 231 enters the user's eye 30. The lines of the principal rays 41 from the corresponding points of different elemental images 531 extended backward of the elemental pixel groups 211 intersect at the point c of the reproduced image. The user recognizes the light in the viewing direction that intersects with the point c as light from the point c of the reproduced image.

In the state illustrated in FIG. 8A, the eye 30 is hyperopic; the focal point (not shown) of the light from the reproduced image is behind the retina. In this condition, the reproduced image seen by the user with the eye 30 is blurry and the user cannot see it clearly.

Figure 8B:
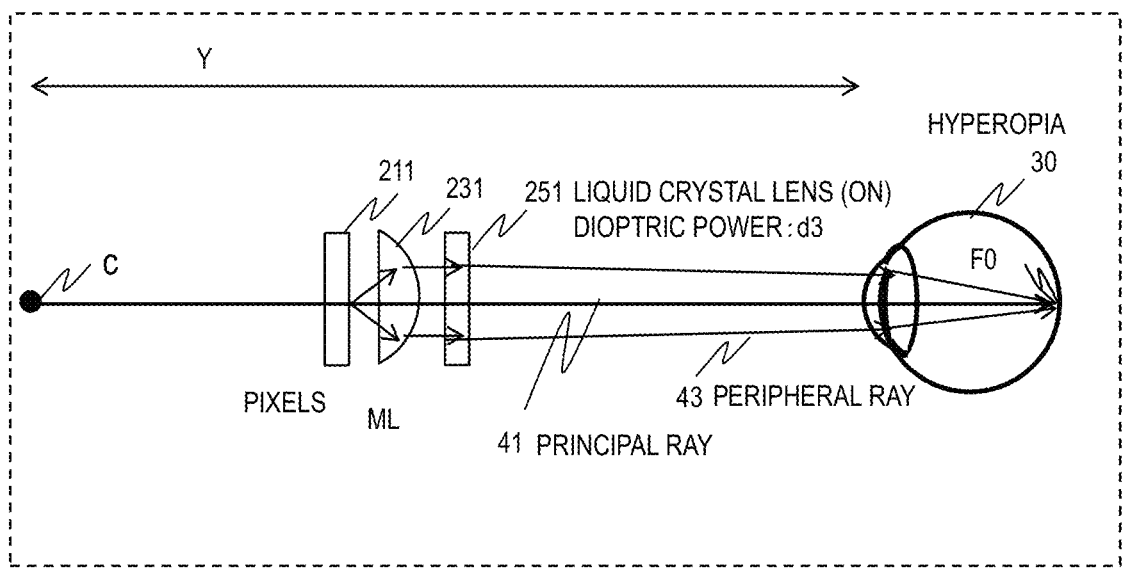
FIG. 8B schematically illustrates correction of a reproduced image with a liquid crystal lens.

FIG. 8B schematically illustrates correction of the reproduced image with a liquid crystal lens 251. FIG. 8B illustrates correction for a user who cannot clearly see the reproduced image at the distance Y because of hyperopia. The liquid crystal lens 251 has a dioptric power d3. The value of d3 in diopter is a positive value and the liquid crystal lens 251 functions as a convex lens.

In this example, the liquid crystal lens 251 decreases the divergence degree (increases the convergence degree) of the parallel light from the microlens 231 to convert the incident parallel light to convergent light. The liquid crystal lens 251 decreases the extent of divergence of the peripheral rays 43 while maintaining the traveling direction of the principal ray 41. The principal ray 41 passes through the point c in the same manner as when the liquid crystal lens 251 is not provided (the power of the liquid crystal lens is 0 diopters).

The convergent light from the liquid crystal lens 251 enters the user's eye 30. Because of the change in incident angle onto the eye 30, the focal point of the incident light on the eye 30 moves from the point behind the retina to the point F0 on the retina. In this way, the liquid crystal lens 251 changes the extent of divergence of the peripheral rays to correct the reproduced image at the distance Y, so that the reproduced image is clearly seen with the eye 30. The correction with the liquid crystal lens 251 corresponds to moving the reproduced image away from the user's eye 30. Moving the reproduced image away from the eye 30 enables the hyperopic eye 30 to focus the light of the reproduced image on the retina.

Figure 9A:
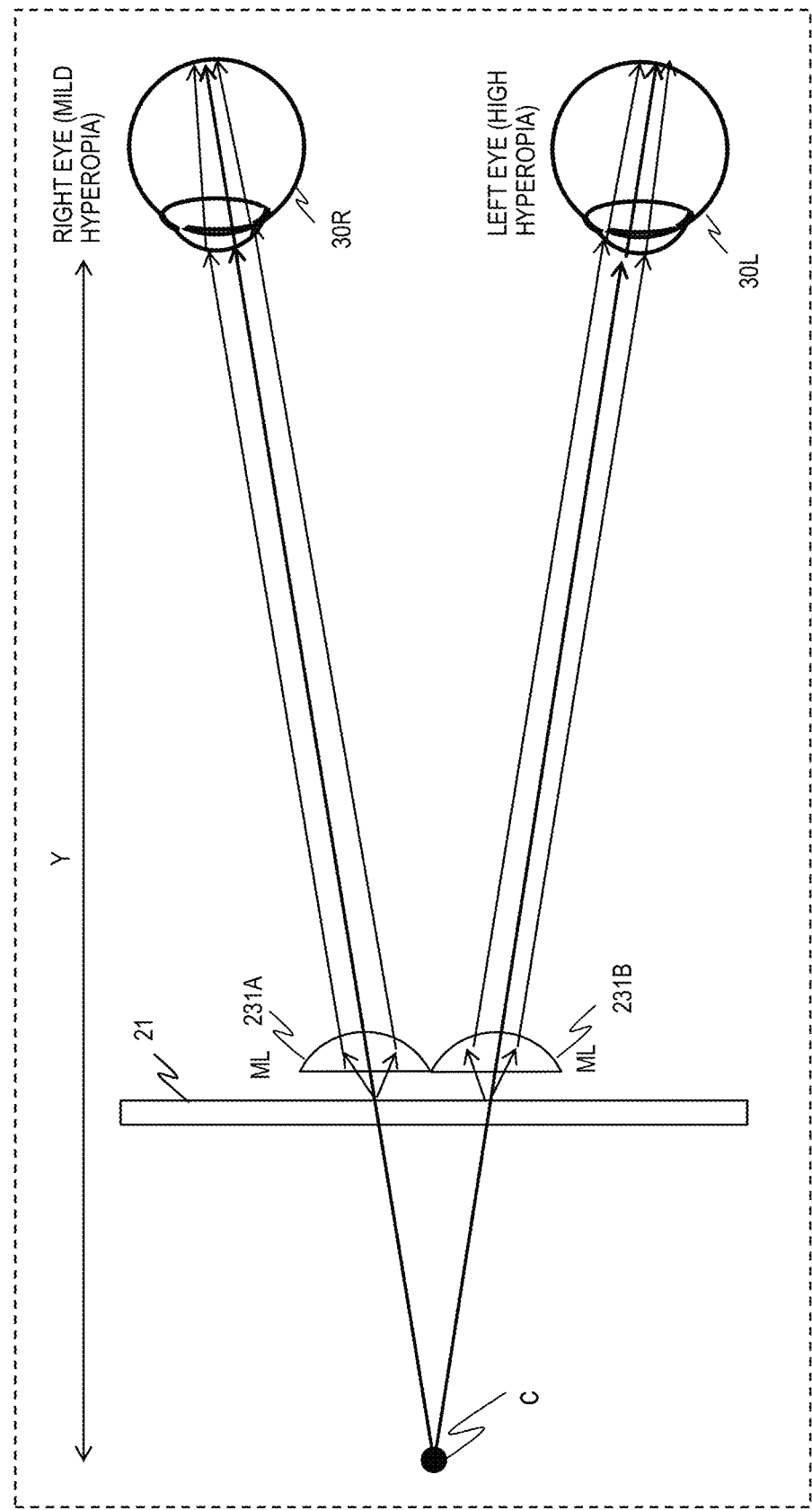
FIG. 9A illustrates an example where the description provided with reference to FIG. 8A is applied to both the right and left eyes.
Figure 9B:
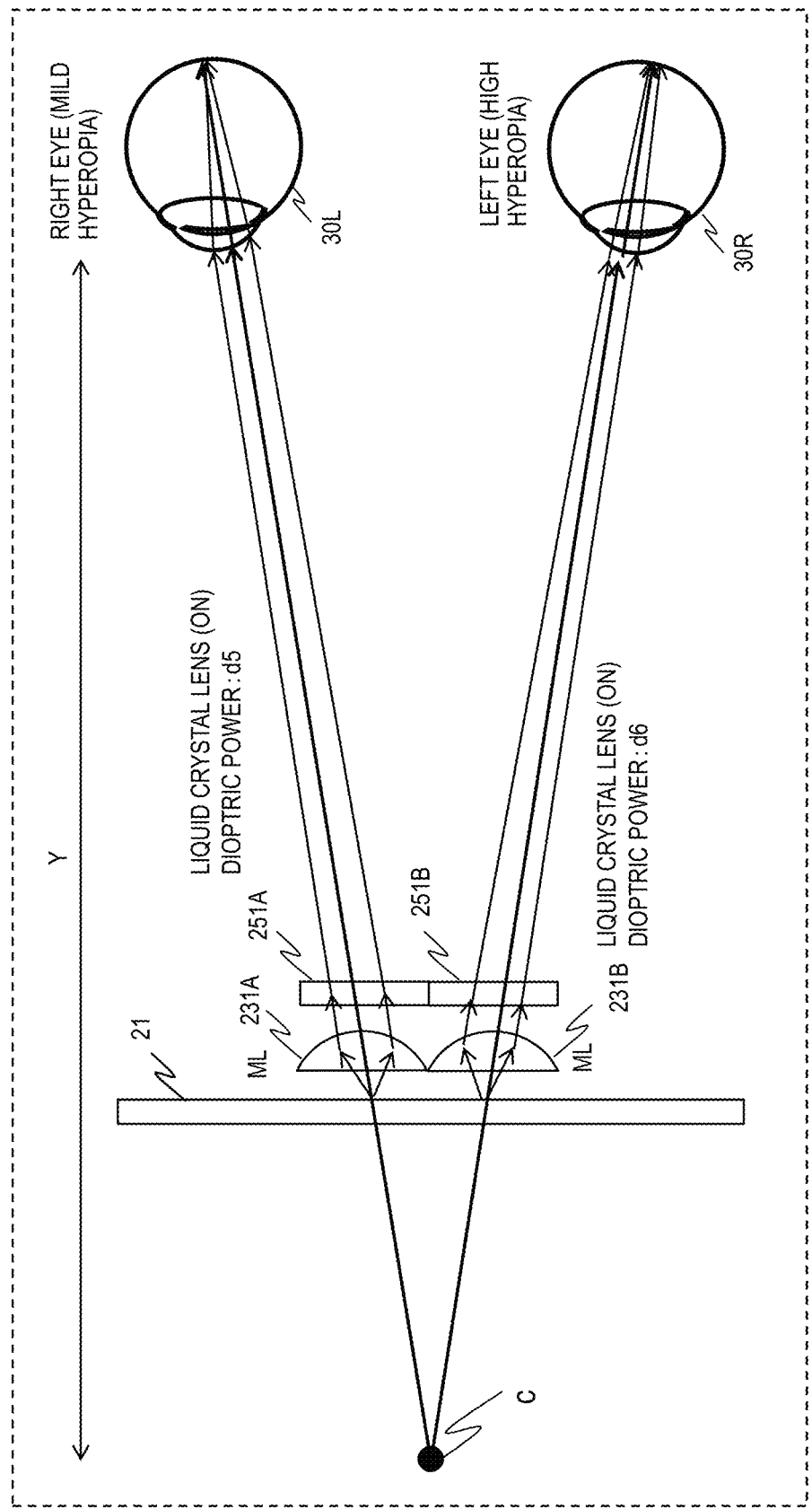
FIG. 9B illustrates an example where the description provided with reference to FIG. 8B is applied to both the right and left eyes.

FIGS. 9A and 9B illustrate an example where the description provided with reference to FIGS. 8A and 8B is applied to both the right and left eyes. FIG. 9A illustrates the configuration in which the liquid crystal lens array 25 is omitted or the powers of the liquid crystal lenses therein are 0 diopters. The light from the point of one elemental image corresponding to a point of the reproduced image passes through a microlens 231B and enters the left eye 30L. The light from the point of another elemental image corresponding to the same point of the reproduced image passes through a microlens 231A and enters the right eye 30R.

As described above, the divergent light from a point of an elemental image is converted by a microlens into parallel light. The point c is on the intersection of the lines of the principal rays from the microlenses 231A and 231B extended backward of the microlenses 231A and 231B. The point c is a position of the corresponding point of the reproduced image.

In the example of FIG. 9A, the right eye 30R is mildly hyperopic and the left eye 30L is highly hyperopic. The focal points of the right eye 30R and the left eye 30L are both behind the retina; the user cannot clearly see the reproduced image with either the right eye 30R or the left eye 30L.

As illustrated in FIG. 9B, a liquid crystal lens 251A is provided in front of the microlens 231A and a liquid crystal lens 251B is provided in front of the microlens 231B. The liquid crystal lenses 251A and 251B correct the travel of the light from the microlenses 231A and 231B, respectively.

The liquid crystal lens controller 13 of the display controller 10 independently controls the dioptric powers of the liquid crystal lenses 251A and 251B. The liquid crystal lens controller 13 controls the dioptric powers of the liquid crystal lenses 251A and 251B to take positive values. The liquid crystal lens controller 13 further adjusts the liquid crystal lenses 251A and 251B so that the dioptric value d6 of the liquid crystal lens 251B is greater than the dioptric value d5 of the liquid crystal lens 251A.

Both the lines of the principal rays from the liquid crystal lenses 251A and 251B extended backward of the display module 21 pass through the point c. The convergent light from the liquid crystal lens 251A enters the mild hyperopic right eye 30R and the convergent light from the liquid crystal lens 251B enters the high hyperopic left eye 30L.

The divergence degree of the light from the liquid crystal lens 251B is smaller than the divergence degree of the light from the liquid crystal lens 251A. In other words, the convergence degree of the light from the liquid crystal lens 251B is larger than the convergence degree of the light from the liquid crystal lens 251A. Accordingly, both the high hyperopic left eye 30L and the low hyperopic right eye 30R can naturally focus the light on the retina.

As described above, in the case where the right eye and the left eye have different visual acuity, appropriate visual correction is achieved by independently controlling the liquid crystal lenses for the right eye and the liquid crystal lenses for the left eye.

Control of Display Module and Liquid Crystal Lenses

Hereinafter, control of the display module 21 and the liquid crystal lens array 25 to be performed by the display controller 10 is described. The display controller 10 controls the vision corrective display module 20 in accordance with the information on the user's visual acuity input by the user and instructions from the user input through operation of the input device.

Figure 10:
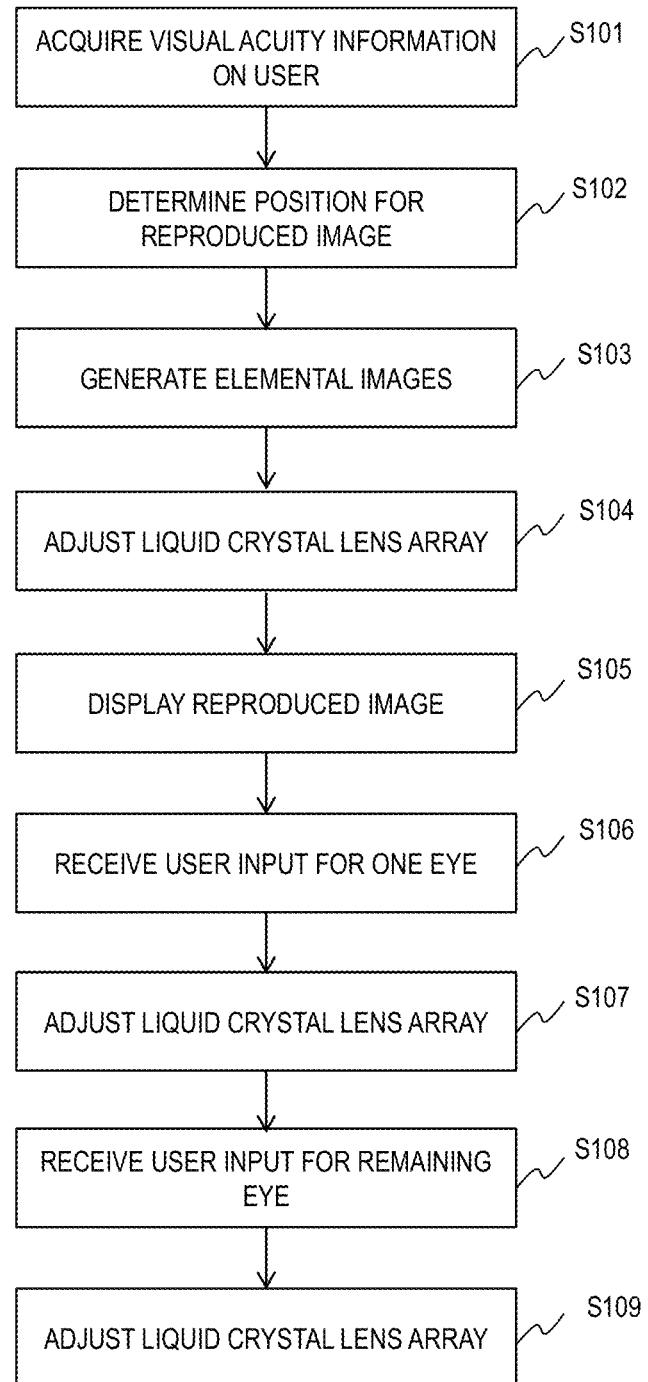
FIG. 10 illustrates a process flow of a display controller.

FIG. 10 illustrates a process flow of the display controller 10. The display controller 10 acquires visual acuity information 51 input by the user through the input device 127 (S101). The visual acuity information 51 may be stored in advance in the auxiliary storage device 125. The display controller acquires visual acuity information 51 from the auxiliary storage device 125 in accordance with the user's instruction.

The visual acuity information 51 indicates the visual acuity levels of the right eye and the left eye in diopter, for example. The visual acuity level of an eye in diopter can be indicated by the same scale as lenses. For example, myopia can be indicated by a negative value of diopter, and hyperopia can be indicated by a positive value of diopter.

The elemental image generator 11 determines the position for the reproduced image based on the visual acuity information 51 (S102). For example, in the case where the visual acuity information 51 indicates myopia, the elemental image generator 11 determines that the position for the reproduced image is a position at a predetermined distance from the display module 21 in front of the display module 21. In the case where the visual acuity information 51 indicates hyperopia, the elemental image generator 11 determines that the position for the reproduced image is a position at a predetermined distance from the display module 21 behind the display module 21.

The elemental image generator 11 may change the distance between the reproduced image and the display module 21 in accordance with the visual acuity level indicated in the visual acuity information 51. The elemental image generator 11 may hold a predefined function or conversion table (these are conversion information) to determine the distance between the reproduced image and the display module 21 in accordance with the visual acuity of the right eye and/or the left eye indicated in the visual acuity information 51. When the level of the myopia or hyperopia is higher, the distance between the reproduced image and the display module 21 is longer. Like the aforementioned way that uses a predetermined distance, the reproduced image for myopia is to be located in front of the display module 21 and the reproduced image for hyperopia is to be located behind the display module 21.

The elemental image generator 11 generates a plurality of elemental images (one image consisting of these plurality of elemental images) to be displayed by the display module 21 from the original image 53, based on the determined position for the reproduced image. As described with reference to FIGS. 2A, 2B, 7A, and 7B, the orientations of the elemental images are different depending on the positional relation between the reproduced image and the display module 21.

The elemental image generator 11 generates elemental images for individual elemental pixel groups in the display module 21 in accordance with a predefined model. Generating elemental images is a known technique and detailed description is omitted herein. In the configuration where the distance between the reproduced image and the display module 21 is changed depending on the visual acuity information 51, the elemental image generator 11 changes the shapes of the elemental images and their positions in the elemental pixel groups based on the distance to change the position of the reproduced image.

The liquid crystal lens controller 13 adjusts the liquid crystal lens array 25 based on the visual acuity information 51 (S104). Specifically, the liquid crystal lens controller 13 determines the dioptric power of the liquid crystal lenses for the right eye and the dioptric power of the liquid crystal lenses for the left eye based on the visual acuity information on the right eye and the left eye and the position for the reproduced image.

The elemental image generator 11 holds a predefined function or a conversion table (these are conversion information) and determines one dioptric value suitable for the condition (visual acuity) of the right eye based on the condition of the right eye indicated by the visual acuity information 51 and the position of the reproduced image. Furthermore, the elemental image generator 11 determines one dioptric value suitable for the condition (visual acuity) of the left eye based on the condition of the left eye indicated by the visual acuity information 51 and the position of the reproduced image.

The liquid crystal lens controller 13 controls specific liquid crystal lenses to have one of the two determined dioptric values and controls the remaining liquid crystal lenses to have the other one of the two determined dioptric values. The details of the adjustment of the liquid crystal lens array 25 will be described later. In this way, the liquid crystal lens controller 13 controls the liquid crystal lens array 25 to match the visual acuity of the user's right eye and the visual acuity of the user's left eye with reference to the visual acuity information 51.

The position of the reproduced image is indicated with whether the position is in front of or behind the display module 21 and the distance from the display module 21. As described above, the distance is a predetermined fixed value or a variable to be determined in accordance with the visual acuity information 51. The elemental image generator 11 may determine a dioptric value common to all liquid crystal lenses based on the condition of the right eye and/or the left eye and the position for the reproduced image. In the case where the dioptric value is common to all liquid crystal lenses, the liquid crystal lens controller 13 controls all liquid crystal lenses to show the common dioptric value.

Next, the display controller 10 displays the reproduced image (S105). Specifically, the elemental image generator 11 sends data for one display image including the plurality of generated elemental images to the display module 21. The display module 21 displays each of the plurality of elemental images with the associated elemental pixel group in accordance with the received image data.

The user sees the displayed reproduced image and determines whether to re-adjust the liquid crystal lens array 25. If re-adjustment of the liquid crystal lens array 25 is necessary, the user designates either the right eye or the left eye with the input device 127 and manually adjusts the liquid crystal lenses associated with the condition of the designated eye.

The liquid crystal lens controller 13 receives designation of either the right eye or the left eye from the input device 127. The liquid crystal lens controller 13 identifies the liquid crystal lenses having the dioptric power determined in accordance with the visual acuity of the designated eye. The relations of the visual acuity of the right and left eyes to the liquid crystal lenses for the right eye and the left eye will be described later. The liquid crystal lens controller 13 instructs the elemental image generator 11 to selectively display the corresponding elemental images (eliminate the other elemental images) with designation of the identified liquid crystal lenses. As a result, the user can re-adjust the liquid crystal lenses for the designated eye more easily.

The elemental image generator 11 sends image data only for the elemental images for the elemental pixel groups opposed to the selected liquid crystal lenses to the display module 21, assuming that the number of liquid crystal lenses opposed to one elemental pixel group is one. As an option, all elemental images may be kept displayed.

The liquid crystal lens controller 13 receives an instruction to increase or reduce the dioptric power of the liquid crystal lenses for the designated eye through the input device 127 (S106). The user instructs the display controller 10 to increase or reduce the dioptric power of the liquid crystal lenses in accordance with the visual acuity of the selected eye. The liquid crystal lens controller 13 changes the dioptric power of the identified liquid crystal lenses in accordance with the instruction from the user (S107). As understood from the above, the liquid crystal lens controller 13 controls the liquid crystal lens array 25 to match the visual acuity of the designated eye in accordance with an input from the user. In response to an instruction from the user to terminate the adjustment, the liquid crystal lens controller 13 terminates the adjustment of the liquid crystal lenses for the designated eye.

The liquid crystal lens controller 13 receives designation of the remaining right eye or left eye from the input device 127. The liquid crystal lens controller 13 identifies the liquid crystal lenses having the dioptric power determined in accordance with the visual acuity of the designated eye. The liquid crystal lens controller 13 instructs the elemental image generator 11 to selectively display the corresponding elemental images (eliminate the other elemental images) with designation of the identified liquid crystal lenses.

The elemental image generator 11 sends image data only for the elemental images for the elemental pixel groups opposed to the designated liquid crystal lenses to the display module 21. As an option, all elemental images may be kept displayed.

The liquid crystal lens controller 13 receives an instruction to increase or reduce the dioptric power of the liquid crystal lenses for the designated eye through the input device 127 (S108). The user instructs the display controller 10 to increase or reduce the dioptric powers of the liquid crystal lenses in accordance with the visual acuity of the selected eye. The liquid crystal lens controller 13 changes the dioptric power of the identified liquid crystal lenses in accordance with the instruction from the user (S109). The liquid crystal lens controller 13 controls the liquid crystal lens array 25 to match the visual acuity of the designated eye in accordance with an input from the user. In response to an instruction from the user to terminate the adjustment, the liquid crystal lens controller 13 terminates the adjustment of the liquid crystal lenses for the designated eye.

Steps S106 to S109 can be omitted. The elemental image generator 11 may change the position of the reproduced image in accordance with the manual operation of the user. The elemental image generator 11 may determine two positions for the reproduced image in accordance with the visual acuity of the right eye and the left eye. The elemental image generator 11 may generate elemental images opposed to the liquid crystal lenses to be controlled in accordance with the visual acuity of the left eye at the position determined based on the visual acuity of the left eye and generate elemental images opposed to the liquid crystal lenses to be controlled in accordance with the visual acuity of the right eye at the position determined based on the visual acuity of the right eye.

Figure 11:
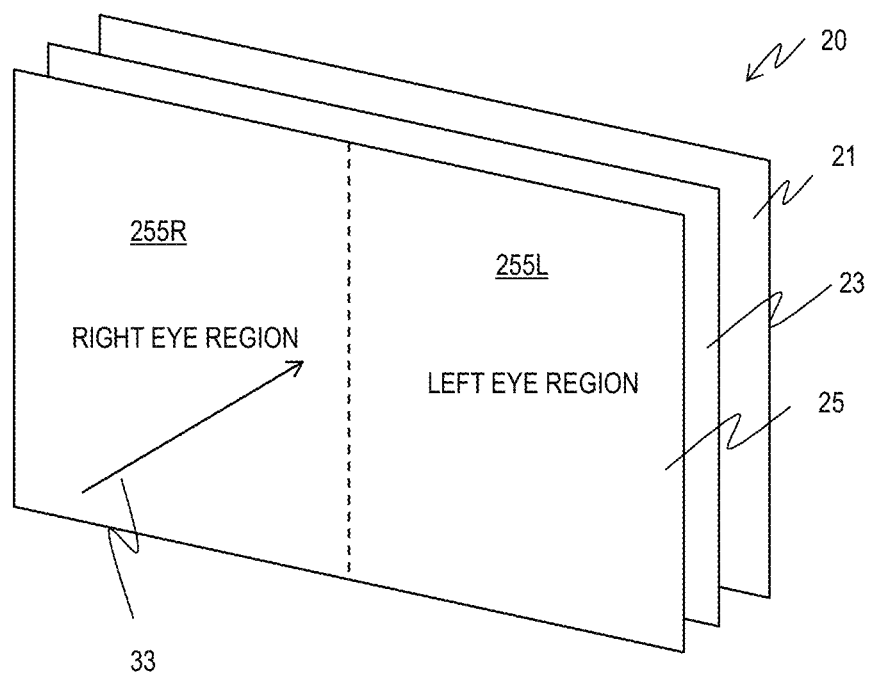
FIG. 11 schematically illustrates a vision corrective display module for correcting a reproduced image for a myopic user.

Hereinafter, relations of the visual acuity of right and left eyes to the liquid crystal lenses for the right eye and the left eye are described. FIG. 11 schematically illustrates a vision corrective display module 20 for correcting a reproduced image for a myopic user. The right eye region 255R of the liquid crystal lens array 25 has a dioptric power in accordance with the visual acuity of the right eye and the left eye region 255L has a dioptric power in accordance with the visual acuity of the left eye.

In the example of FIG. 11, the right eye region 255R is the left half region of the liquid crystal lens array 25 when seen in the viewing direction 33.

The left eye region 255L is the right half region of the liquid crystal lens array 25 when seen in the viewing direction 33. The boundary between the right eye region 255R and the left eye region 255L is the horizontal center of the liquid crystal lens array 25. The boundary does not have to be the center.

The liquid crystal lens controller 13 controls the right eye region 255R and the left eye region 255L independently in accordance with the visual acuity information on the user and/or user operation. All liquid crystal lenses in the right eye region 255R have the same dioptric power and the all liquid crystal lenses in the left eye region 255L have the same dioptric power.

Figure 12:
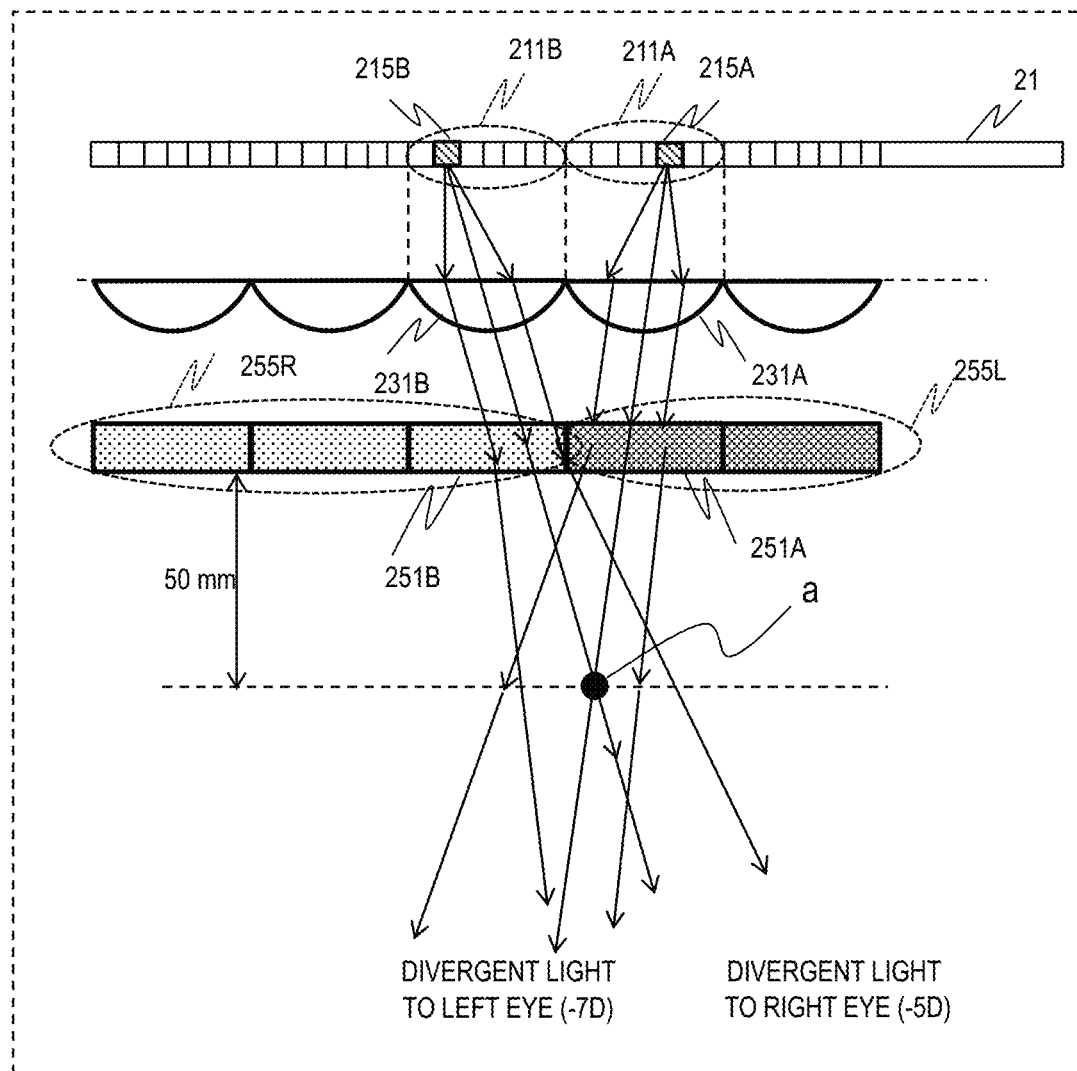
FIG. 12 schematically illustrates a proximity of the boundary between the right eye region and the left eye region.

FIG. 12 schematically illustrates a proximity of the boundary between the right eye region 255R and the left eye region 255L. In this example, the position a for the reproduced image is at 50 mm from the liquid crystal lens array 25 in front of the vision corrective display module 20. The level (visual acuity) of a highly myopic left eye is −7D and the level (visual acuity) of a mildly myopic right eye is −5D.

The divergent light from one pixel 215A included in an elemental pixel group 211A changes to parallel light because of a microlens 231A. The light from the microlens 231A enters a liquid crystal lens 251A. The liquid crystal lens 251A is included in the left eye region 255L. The liquid crystal lens 251A has a negative dioptric power to change parallel light to divergent light. The light from the liquid crystal lens 251A travels to the left eye.

The divergent light from one pixel 215B included in an elemental pixel group 211B changes to parallel light because of a microlens 231B. The light from the microlens 231B enters a liquid crystal lens 251B. The liquid crystal lens 251B is included in the right eye region 255R. The liquid crystal lens 251B has a negative dioptric power to change parallel light to divergent light. The light from the liquid crystal lens 251B travels to the right eye.

As described above, the dioptric value of the left eye is smaller than the dioptric value of the right eye; in other words, the absolute value of the dioptric value of the myopic left eye is greater than the absolute value of the dioptric value of the myopic right eye. Accordingly, the dioptric value of the left eye region 255L is smaller than the dioptric value of the right eye region 255R, in other words, the absolute value of the dioptric value of the left eye region 255 L is greater than the absolute value of the dioptric value of the right eye region 255R.

Figure 13:
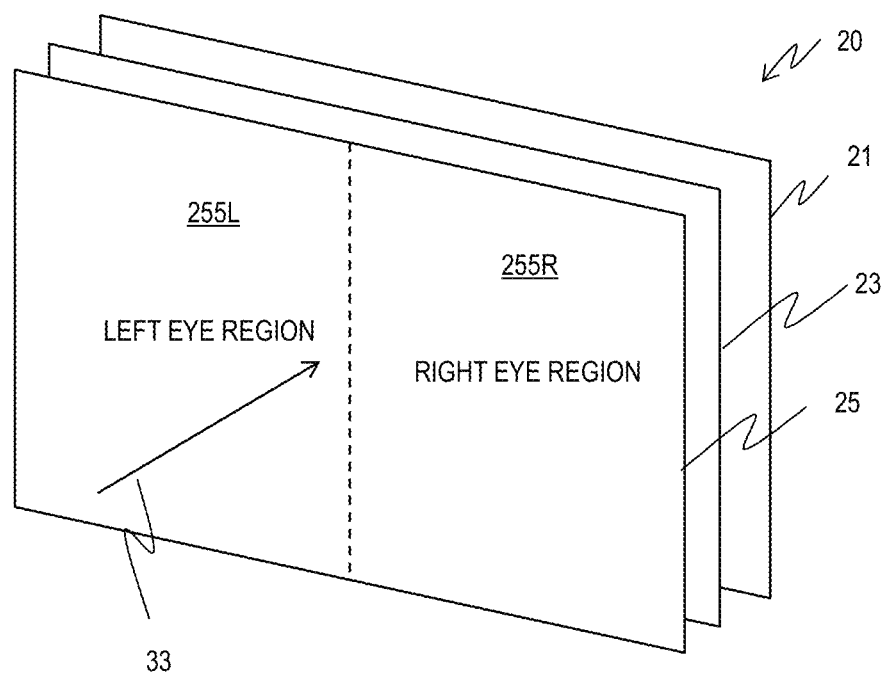
FIG. 13 schematically illustrates a vision corrective display module for correcting a reproduced image for a hyperopic user.

FIG. 13 schematically illustrates a vision corrective display module 20 for correcting a reproduced image for a hyperopic user. The right eye region 255R of the liquid crystal lens array 25 has a dioptric power in accordance with the visual acuity of the right eye and the left eye region 255L has a dioptric power in accordance with the visual acuity of the left eye.

In the example of FIG. 13, the right eye region 255R is the right half region of the liquid crystal lens array 25 when seen in the viewing direction 33. The left eye region 255L is the left half region of the liquid crystal lens array 25 when seen in the viewing direction 33. The boundary between the right eye region 255R and the left eye region 255L is the horizontal center of the liquid crystal lens array 25. The boundary does not have to be the center.

The liquid crystal lens controller 13 controls the right eye region 255R and the left eye region 255L independently in accordance with the visual acuity information on the user and/or user operation. All liquid crystal lenses in the right eye region 255R have the same dioptric power and the all liquid crystal lenses in the left eye region 255L have the same dioptric power.

Figure 14:
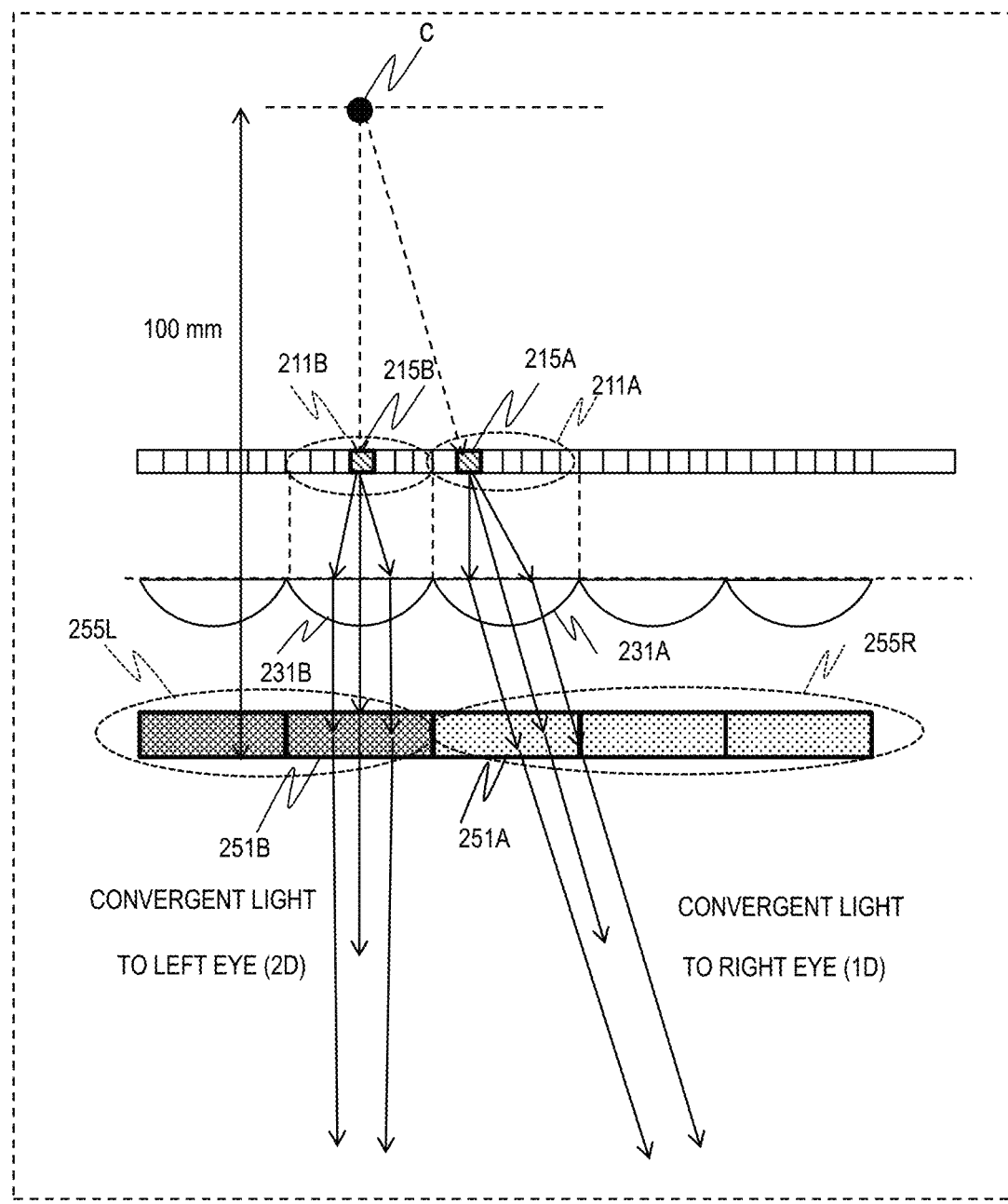
FIG. 14 schematically illustrates a proximity of the boundary between the right eye region and the left eye region.

FIG. 14 schematically illustrates a proximity of the boundary between the right eye region 255R and the left eye region 255L. In this example, the position c for the reproduced image is 100 mm from the liquid crystal lens array 25 behind the vision corrective display module 20. The level (visual acuity) of a highly hyperopic left eye is 2D and the level (visual acuity) of a mildly hyperopic right eye is 1D.

The divergent light from one pixel 215A included in an elemental pixel group 211A changes to parallel light because of a microlens 231A. The light from the microlens 231A enters a liquid crystal lens 251A. The liquid crystal lens 251A is included in the right eye region 255R. The liquid crystal lens 251A has a positive dioptric power to change parallel light to convergent light. The light from the liquid crystal lens 251A travels to the right eye.

The divergent light from one pixel 215B included in an elemental pixel group 211B changes to parallel light because of a microlens 231B. The light from the microlens 231B enters a liquid crystal lens 251B. The liquid crystal lens 251B is included in the left eye region 255L. The liquid crystal lens 251B has a positive dioptric power to change parallel light to convergent light. The light from the liquid crystal lens 251B travels to the left eye.

As described above, the dioptric value of the hyperopic left eye is greater than the dioptric value of the hyperopic right eye. Accordingly, the dioptric value of the left eye region 255L is greater than the dioptric value of the right eye region 255R.

In the foregoing examples, the liquid crystal lens controller 13 controls a horizontally divided half of the liquid crystal lens array 25 in accordance with the visual acuity of the right eye and controls the other half in accordance with the visual acuity of the left eye. Such control is based on the assumption that the horizontal centers of the display module 21 and the liquid crystal lens array 25 substantially match the midpoint between the user's left eye and right eye.

Figure 15:
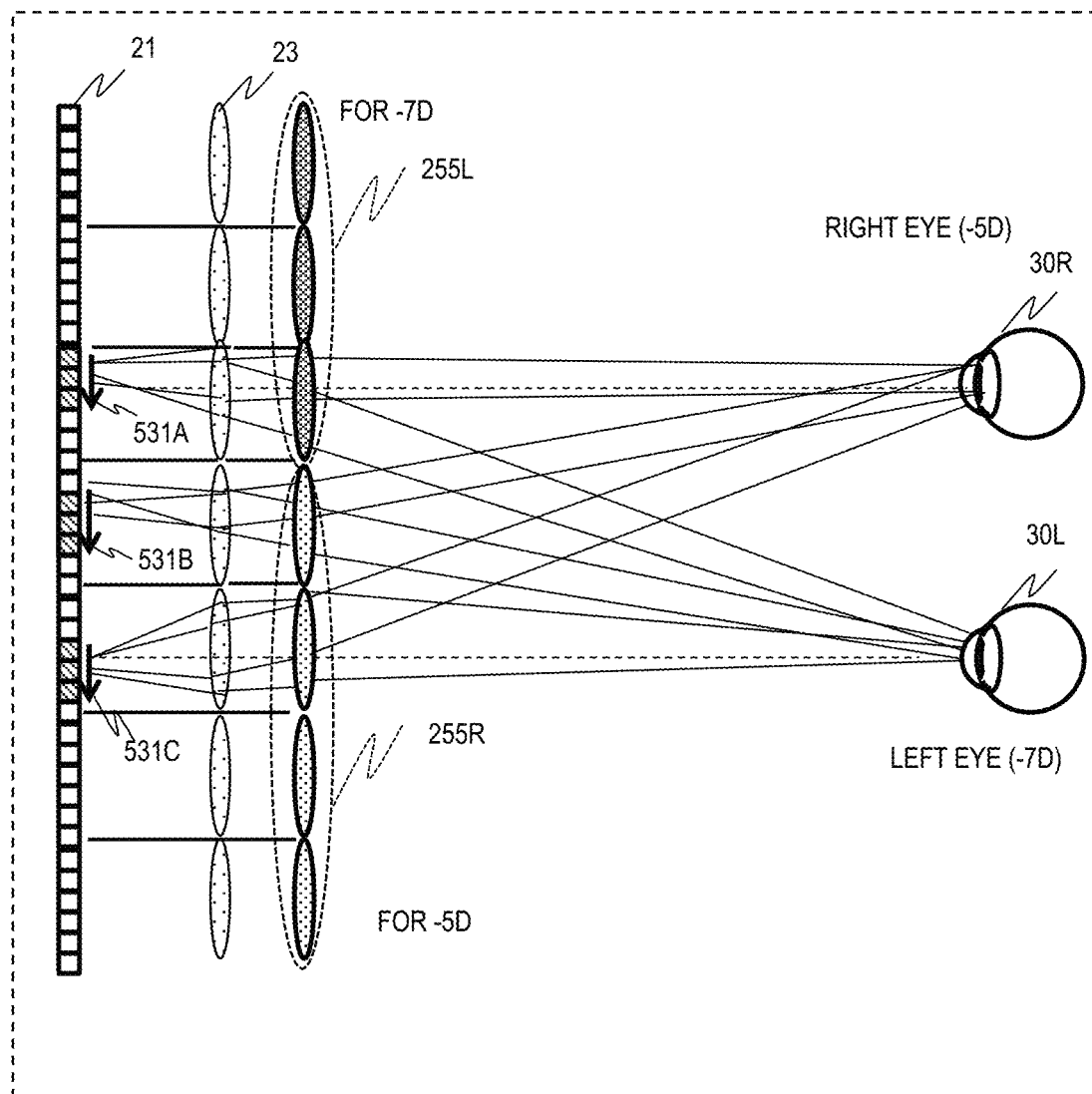
FIG. 15 schematically illustrates that elemental images displayed in a proximity of the boundary between the right eye region and the left eye region can be seen with both of the right eye and the left eye.

As illustrated in FIG. 15, the elemental images 531A, 531B, and 531C displayed in a proximity of the boundary between the right eye region 255R and the left eye region 255L can be seen with both of the right eye 30R and the left eye 30L.

Other Embodiments

Figure 16:
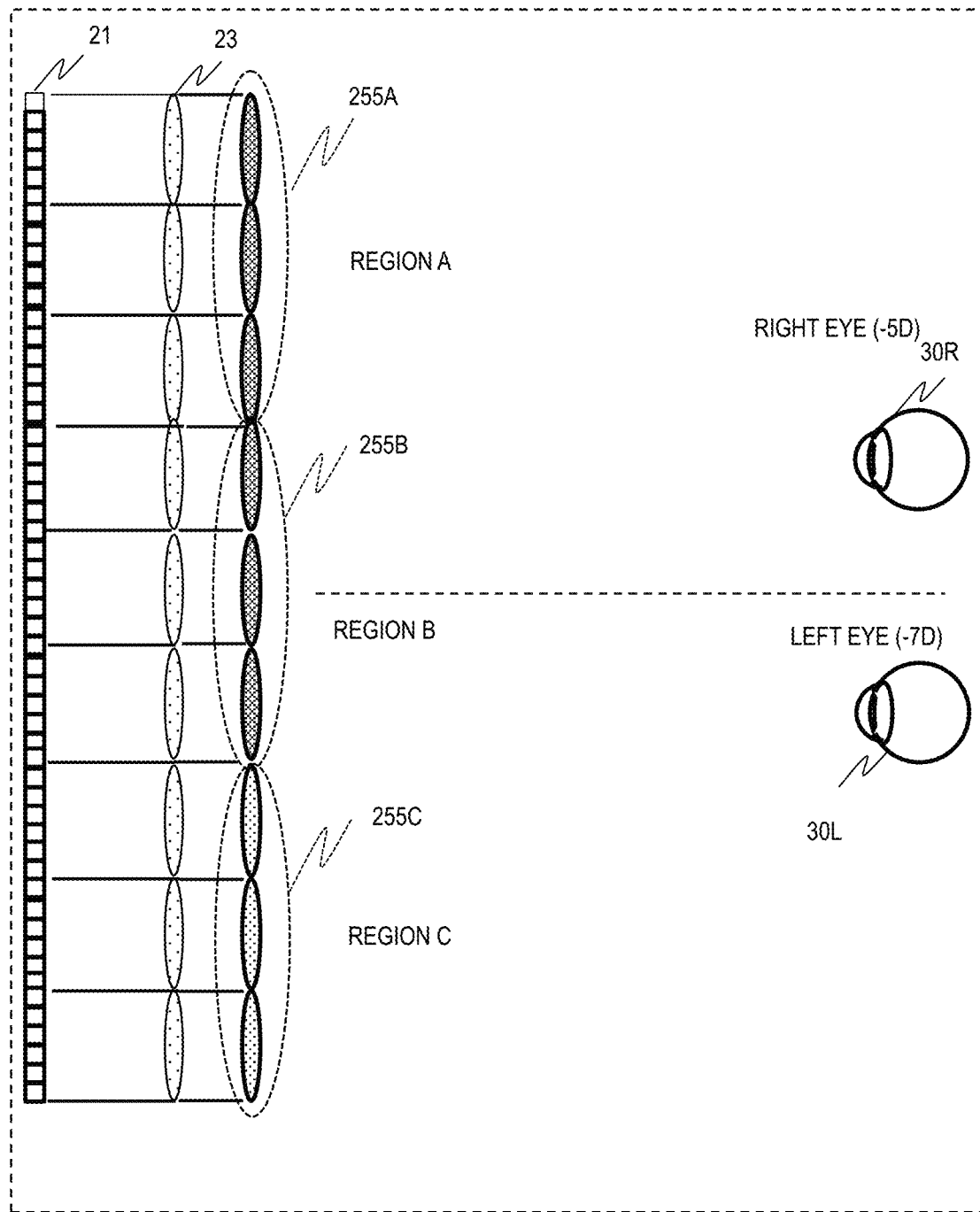
FIG. 16 illustrates another example of diopter control for a liquid crystal lens array.

FIG. 16 illustrates another example of diopter control for the liquid crystal lens array 25. The liquid crystal lens array 25 is horizontally separated into three regions 255A, 255B, and 255C to be controlled. The boundaries of the regions extend vertically or perpendicularly to the horizontal direction. In an example, the regions 255A and 255C on both sides have the same width and the central region 255B has a width narrower than the widths of the other regions 255A and 255C. The widths of these regions are determined appropriately depending on the design.

The liquid crystal lens controller 13 controls the region 255A in accordance with the visual acuity of one eye, controls the region 255C in accordance with the visual acuity of the other eye, and controls the central region 255B in accordance with the worse visual acuity or the greater absolute value in the visual acuity level (diopter).

In FIG. 16, the left eye 30L is highly myopic (−7D) and the right eye 30R is mildly myopic (−5D). The vision corrective display device 1 displays the reproduced image in front of the display module 21. The liquid crystal lens controller 13 controls the region 255A in accordance with the visual acuity of the left eye 30L and controls the region 255C in accordance with the visual acuity of the right eye 30R. Since the visual acuity of the left eye 30L is worse than the visual acuity of the right eye 30R, the liquid crystal lens controller 13 controls the central region 255B in accordance with the visual acuity of the left eye 30L. For example, the dioptric power of the central region 255B is to be the same as the dioptric power of the region 255A. Such control enables the user to see the reproduced image more clearly.

In the control of the liquid crystal lens array 25 in accordance with the user's manual operation, the display controller 10 selectively displays elemental images of the elemental pixel groups opposed to the liquid crystal lenses to be controlled in accordance with the visual acuity of the selected eye, as described above. The display controller 10 displays elemental images opposed to the central region 255B in adjusting the liquid crystal lenses for the eye having the worse visual acuity and turns off the elemental pixel groups opposed to the central region 255B in adjusting the liquid crystal lenses for the other eye.

Figure 17:
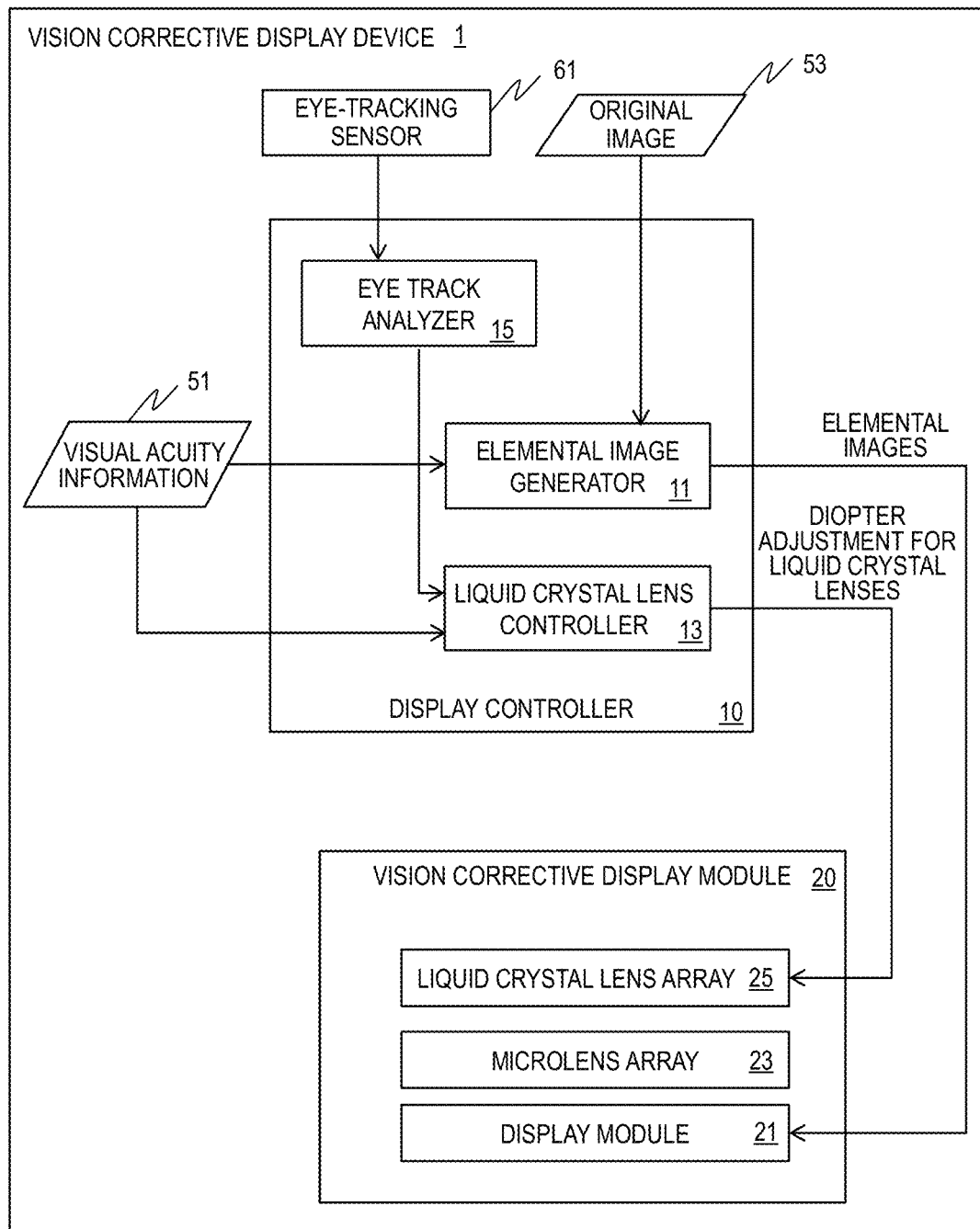
FIG. 17 schematically illustrates another example of the logical configuration of the vision corrective display device.

Next, another configuration example of the vision corrective display device 1 is described. FIG. 17 schematically illustrates an example of a logical configuration of the vision corrective display device 1. The vision corrective display device 1 includes an eye-tracking sensor 61 and an eye track analyzer 15, in addition to the configuration described with reference to FIG. 1A. The remaining is the same as the configuration in FIG. 1A.

The eye-tracking sensor 61 measures and tracks the lines of sight of the user's right eye and left eye. The eye track analyzer 15 determines the start points and the directions of the lines of sight of the right eye and the left eye (line-of-sight information). The start point of a line of sight corresponds to the position of the eye. The eye track analyzer 15 sends the line-of-sight information to the liquid crystal lens controller 13.

For example, the liquid crystal lens controller 13 controls the liquid crystal lens array 25 based on the line-of-sight information. Specifically, the liquid crystal lens controller 13 determines the liquid crystal lenses to be controlled in accordance with the visual acuity of the right eye and the liquid crystal lenses to be controlled in accordance with the visual acuity of the left eye, based on the line-of-sight information.

For example, the liquid crystal lens controller 13 determines the midpoint between the line of sight of the right eye and the line of sight of the left eye on the liquid crystal lens array 25 and determines the left eye region 255L and the right eye region 255R so that the midpoint is included in the boundary between the left eye region 255L and the right eye region 255R.

In the case of the configuration where the liquid crystal lens array 25 is separated into three regions to be controlled, the liquid crystal lens controller 13 determines the three regions so that the aforementioned midpoint is included in the central line of the central region 255B. The width of the central region may be fixed. Alternatively, the liquid crystal lens controller 13 may determine the width of the central region based on the average of the angles of the lines of sight.

The liquid crystal lens controller 13 may use a point where a virtual line extending from the center between the right eye and the left eye in the direction of the normal to the liquid crystal lens array 25 hits the liquid crystal lens array 25, in place of the midpoint between the lines of sight. The line-of-sight information is sufficient if it includes information to be referred to by the liquid crystal lens controller 13.

For example, the liquid crystal lens controller 13 may determine the dioptric powers of the liquid crystal lenses based on the line-of-sight information. The above-described configuration example controls the dioptric powers of the liquid crystal lens array 25, assuming a specific distance for the distance between the user's eye and the vision corrective display module 20. The liquid crystal lens controller 13 may determine the distance between the user's eye and the vision corrective display module 20 from the line-of-sight information and determine the dioptric powers of the liquid crystal lenses depending on the determined value.

For example, the conversion information (a function or table) for determining a dioptric power may include a variable of distance. The distance between the user's eye and the vision corrective display module 20 may be defined using the midpoint between the right and left eyes and the line extending in the direction of the normal to the vision corrective display module 20.

The liquid crystal lens controller 13 may control the liquid crystal lens array 25 in real time based on the line-of-sight information. Alternatively, the liquid crystal lens controller 13 may determine the control values for the liquid crystal lens array 25 based on the line-of-sight information before displaying a reproduced image and maintain the control values.

The above-described control of the liquid crystal lens array 25 based on the line-of-sight information on the user enables the reproduced image to be corrected more appropriately for the user's state. Meanwhile, the elemental image generator 11 may control the reproduced image based on the line-of-sight information. For example, the elemental image generator 11 may determine the position of the reproduced image based on the distance from the midpoint between the left eye to the right eye and the vision corrective display module 20.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment may be replaced with a configuration of another embodiment or a configuration of an embodiment may be incorporated into a configuration of another embodiment.

What is claimed is:

1. A display device, comprising:
   a display module including a plurality of elemental pixel groups, each of the plurality of elemental pixel groups being configured to display an elemental image for displaying a reproduced image;
   an elemental lens array including a plurality of elemental lenses, the plurality of elemental lenses being provided in front of the plurality of elemental pixel groups in one-to-one correspondence;
   a diopter adjustment element array including a plurality of diopter adjustment elements, the plurality of diopter adjustment elements being provided in front of the plurality of elemental lenses in one-to-one correspondence; and
   a controller, wherein the controller is configured to:
when reproducing the reproduced image in front of the display module, control a left region of the diopter adjustment element array for a right eye of the user and a right region of the diopter adjustment element array for a left eye of the user,
when reproducing the reproduced image behind the display module, control the left region of the diopter adjustment element array for the left eye of the user and the right region of the diopter adjustment element array for the right eye of the user,
control a part of the plurality of diopter adjustment elements in accordance with visual acuity of one eye of a user, and
control the other part of the plurality of diopter adjustment elements in accordance with visual acuity of the other eye of the user.

2. The display device according to claim 1, wherein the controller is further configured to:
determine a position for the reproduced image based on information on visual acuity of the user, and
generate the elemental images for the plurality of elemental pixel groups based on the position.

3. The display device according to claim 1, wherein the controller is further configured to:
select diopter adjustment elements to be controlled in accordance with visual acuity of one eye of the user and diopter adjustment elements to be controlled in accordance with visual acuity of the other eye of the user from the plurality of diopter adjustment elements, based on a position for the reproduced image.

4. The display device according to claim 1, wherein the controller is configured to:
control the left and right regions of the diopter adjustment element array in accordance with visual acuity of the left and right eyes of the user.

5. The display device according to claim 4, wherein the left region is a left half region of the plurality of diopter adjustment elements, and the right region is a right half region of the plurality of diopter adjustment elements.

6. The display device according to claim 4,
wherein the diopter adjustment element array includes the right region, the left region, and a central region between the right region and the left region, and
wherein the controller is further configured to:
control the right region in accordance with visual acuity of one eye of the user,
control the left region in accordance with visual acuity of the other eye of the user, and
control the central region in accordance with a worse visual acuity of the user.

7. The display device according to claim 1, wherein the controller is further configured to:
control the diopter adjustment element array so that light transmitted through the diopter adjustment element array does not come into focus until the light enters the eyes of the user.

8. The display device according to claim 1, wherein the controller is further configured to:
generate the elemental images so that the reproduced image is located in front of the display module, and
control the diopter adjustment element array so that light transmitted through the diopter adjustment element array comes into focus before the light enters the eyes of the user.

9. The display device according to claim 1, wherein the controller is further configured to:
adjust dioptric values of the part of the plurality of diopter adjustment elements in accordance with a user input including designation of one eye of the user in a state where elemental images opposed to the part of the plurality of diopter adjustment elements are displayed, and
adjust dioptric values of the other part of the plurality of diopter adjustment elements in accordance with a user input including designation of the other eye of the user in a state where elemental images opposed to the other part of the plurality of diopter adjustment elements are displayed.

10. The display device according to claim 1, further comprising:
an eye-tracking device configured to track a line of sight of the user,
wherein the controller is further configured to:
determine the part of the plurality of diopter adjustment elements and the other part of the plurality of diopter adjustment elements in the diopter adjustment element array based on a measurement result of the eye-tracking device.

11. The display device according to claim 1, wherein a boundary between the right region and the left region is a horizontal center of the diopter adjustment element array.

12. The display device according to claim 1, wherein the controller is further configured to:
determine a midpoint between a line of sight of the right eye and a line of sight of the left eye on the diopter adjustment element array, and determine a boundary between the right region and the left region based on a position of the midpoint.

* * * * *